(12) United States Patent
Shei

(10) Patent No.: US 7,105,779 B2
(45) Date of Patent: Sep. 12, 2006

(54) FOOD WARMING APPARATUS AND METHOD

(75) Inventor: Steven M. Shei, Fort Wayne, IN (US)

(73) Assignee: Duke Manufacturing Company, St. Louis, MO (US)

( * ) Notice: Subject to any disclaimer, the term of this patent is extended or adjusted under 35 U.S.C. 154(b) by 0 days.

(21) Appl. No.: 10/680,626

(22) Filed: Oct. 7, 2003

(65) Prior Publication Data

US 2004/0069155 A1 Apr. 15, 2004

Related U.S. Application Data

(63) Continuation-in-part of application No. 10/611,295, filed on Jul. 1, 2003.
(60) Provisional application No. 60/394,841, filed on Jul. 10, 2002.

(51) Int. Cl.
A21B 1/00 (2006.01)

(52) U.S. Cl. .................... 219/413; 219/394; 99/389
(58) Field of Classification Search ............. 219/394, 219/400, 411, 412, 414, 492, 493; 99/387, 99/978, 483, 474, 476
See application file for complete search history.

(56) References Cited

U.S. PATENT DOCUMENTS

| 466,416 | A | | 1/1892 | Hunt |
| 804,110 | A | | 11/1905 | Favorite et al. |
| 2,076,091 | A | | 4/1937 | O'Neill |
| 2,860,225 | A | * | 11/1958 | Steen ............ 99/389 |
| 2,964,609 | A | | 12/1960 | Anoff |
| 3,051,582 | A | | 8/1962 | Muckler et al. |
| 3,313,917 | A | | 4/1967 | Ditzler et al. |
| 3,353,885 | A | | 11/1967 | Hanson |
| 3,353,886 | A | | 11/1967 | Tompkins |
| 3,601,582 | A | | 8/1971 | Boisfleury |
| 3,681,568 | A | | 8/1972 | Schaefer |
| 3,751,629 | A | | 8/1973 | Eisler |
| 3,752,640 | A | | 8/1973 | Schneider |
| 3,908,749 | A | | 9/1975 | Williams |
| 4,020,310 | A | | 4/1977 | Souder, Jr. et al. |
| 4,024,377 | A | | 5/1977 | Henke |
| 4,110,587 | A | | 8/1978 | Souder, Jr. et al. |
| 4,154,861 | A | | 5/1979 | Smith |
| 4,198,559 | A | | 4/1980 | Walter et al. |
| 4,235,282 | A | | 11/1980 | de Filippis et al. |
| 4,337,384 | A | | 6/1982 | Tanaka et al. |
| 4,374,319 | A | | 2/1983 | Guibert |
| 4,381,442 | A | | 4/1983 | Guibert |
| 4,467,777 | A | | 8/1984 | Weber |
| 4,480,164 | A | | 10/1984 | Dills |
| 4,587,946 | A | | 5/1986 | Doyon et al. |
| 4,691,088 | A | | 9/1987 | Eke |
| 4,784,054 | A | | 11/1988 | Karos et al. |
| 4,967,995 | A | | 11/1990 | Burgess |
| 4,972,824 | A | | 11/1990 | Luebke et al. |

(Continued)

FOREIGN PATENT DOCUMENTS

GB 829729 3/1960

Primary Examiner—Thor S. Campbell
(74) Attorney, Agent, or Firm—Senniger Powers

(57) ABSTRACT

In general, one embodiment of the invention is directed to food holding apparatus for holding pre-cooked food at a selected holding temperature. The apparatus comprises a cabinet having at least one holding compartment therein, and pre-cooked food in the holding compartment, the food having been previously cooked in a cooking appliance. At least one radiant heat source is spaced above the food a distance less than 12 inches for delivering radiant heat to the food. A control mechanism varies the amount of radiant heat delivered by the heat source to the food to maintain the food at the selected holding temperature. A related method is also disclosed.

35 Claims, 19 Drawing Sheets

U.S. PATENT DOCUMENTS

| | | |
|---|---|---|
| 5,028,761 A | 7/1991 | Oda et al. |
| 5,050,578 A | 9/1991 | Luebke et al. |
| 5,172,682 A | 12/1992 | Luebke et al. |
| 5,188,020 A | 2/1993 | Buchnag |
| 5,235,903 A | 8/1993 | Tippmann |
| 5,345,923 A | 9/1994 | Luebke et al. |
| 5,365,038 A | 11/1994 | Mitsugu |
| 5,434,390 A | 7/1995 | McKee et al. |
| 5,496,987 A | 3/1996 | Siccardi et al. |
| 5,653,905 A | 8/1997 | McKinney |
| 5,699,722 A | 12/1997 | Erickson et al. |
| 5,717,192 A | 2/1998 | Dobie et al. |
| 5,724,886 A | 3/1998 | Ewald et al. |
| 5,783,803 A | 7/1998 | Robards, Jr. |
| 5,852,967 A | 12/1998 | Fortmann et al. |
| 5,900,173 A | 5/1999 | Robards, Jr. |
| 5,934,178 A | 8/1999 | Caridis et al. |
| 5,947,012 A | 9/1999 | Ewald et al. |
| 6,011,243 A | 1/2000 | Arnold et al. |
| 6,031,208 A | 2/2000 | Witt et al. |
| 6,119,587 A | 9/2000 | Ewald et al. |
| 6,175,099 B1 | 1/2001 | Shei et al. |
| 6,209,447 B1 | 4/2001 | Ewald et al. |
| 6,262,394 B1 | 7/2001 | Shei et al. |
| 6,358,548 B1 | 3/2002 | Ewald et al. |
| 6,376,817 B1 | 4/2002 | McFadden et al. |
| 6,412,403 B1 | 7/2002 | Veltrop |
| 6,450,085 B1 | 9/2002 | Riesselmann |
| 6,539,846 B1 | 4/2003 | Citterio et al. |
| 6,545,251 B1 | 4/2003 | Allera et al. |
| 6,658,994 B1 | 12/2003 | McMillan |
| 6,710,308 B1 | 3/2004 | Sauter et al. |
| 2003/0047553 A1 | 3/2003 | Patti et al. |

* cited by examiner

FOOD WARMING APPARATUS AND METHOD

CROSS REFERENCE TO RELATED APPLICATION

This application is a continuation-in-part of pending U.S. application Ser. No. 10/611,295, filed Jul. 1, 2003, which claims the benefit of U.S. Provisional Application No. 60/394,841, filed Jul. 10, 2002, titled HOLDING OR COOKING OVEN.

BACKGROUND OF THE INVENTION

This invention relates generally to food service equipment and more particularly to equipment for maintaining foods at temperatures suitable for serving food.

In one embodiment, this invention is especially (but not exclusively) directed to food service equipment that uses infrared (IR) heaters to maintain pre-cooked food at proper temperatures before serving. This type of equipment is referred to using such terms as holding oven, holding unit, and food warmer, and these terms are used interchangeably hereinafter. Such equipment is often used in, for example, the fast food service industry to heat food. However, such equipment has certain disadvantages. For example, short holding times (e.g., twenty minutes or less) and rapid product quality degradation often limit the effectiveness of this technology for holding applications. Additionally, different food products require different amounts of IR energy to be held in optimum condition. The quality of the food being held is affected in large part by the temperature and the air flow in the holding oven. As the food loses moisture due to evaporation, flavor is lost. This affects the texture and taste of the product. For example, chicken meat fibers will dry out and become tough, while the breading will become dry and greasy. French fries will develop a dry, rubbery texture as moisture is lost and the outer skin loses its crispness.

Conventional IR holding devices are not adjustable to control the amount of IR energy delivered to the food being heated. Rather, the heat source is on full power all of the time, and the food is placed relatively far from the heat source to prevent overheating. As a result, the typical prior holding device requires a large amount of vertical space. This can present a problem in a situation where space is at a premium, as in a fast-food restaurant.

U.S. Pat. Nos. 6,175,099, 6,262,394 and 6,541,739, assigned to Duke Manufacturing Co. of St. Louis, Mo. and incorporated herein by reference, are directed to a holding or cooking oven which is an improvement over prior designs and which has proven to be successful with various fried products. However, there is still a need for a technology that extends the holding time and quality of food products, especially fried products such as hash browns, French fries, rotisserie chicken, deep-fried chicken and shrimp.

SUMMARY OF THE INVENTION

Among the several objects of this invention will be noted the provision of food service equipment, e.g., a food warmer, which is adapted for holding pre-cooked food longer without degradation of the quality of the product, including products having a crust which tends to become soggy or rubbery, such as fried potato products, fried chicken, and rotisserie chicken; the provision of such equipment which is more compact than conventional food warming equipment, thus requiring less space; the provision of such an oven which allows evaporative losses to be more closely controlled to enhance food quality; and a method of maintaining previously cooked food in an environment where the quality of the food is maintained at a high level for a longer period of time.

In general, one embodiment of the invention is directed to food holding apparatus for holding pre-cooked food at a selected holding temperature. The apparatus comprises a cabinet having at least one holding compartment therein, and pre-cooked food in the holding compartment, the food having been previously cooked in a cooking appliance. At least one radiant heat source is spaced above the food a distance less than 12 inches for delivering radiant heat to the food. A control mechanism varies the amount of radiant heat delivered by the heat source to the food to maintain the food at the selected holding temperature.

The present invention is also directed to a method of preserving cooked food. The method comprises the steps of cooking food in a cooking appliance to provide pre-cooked food, placing the pre-cooked food in a holding compartment of food warming apparatus for a duration of holding time, and heating the pre-cooked food in the holding compartment for at least a portion of said duration of holding time by delivering radiant heat to the food. The heating step comprises varying the amount of radiant heat delivered to the pre-cooked food to maintain the food at a selected holding temperature.

Other objects and features will be in part apparent and in part pointed out hereinafter.

BRIEF DESCRIPTION OF THE DRAWINGS

Corresponding parts are designated by corresponding reference numbers throughout the drawings.

DETAILED DESCRIPTION OF THE PREFERRED EMBODIMENT

Figure 1:
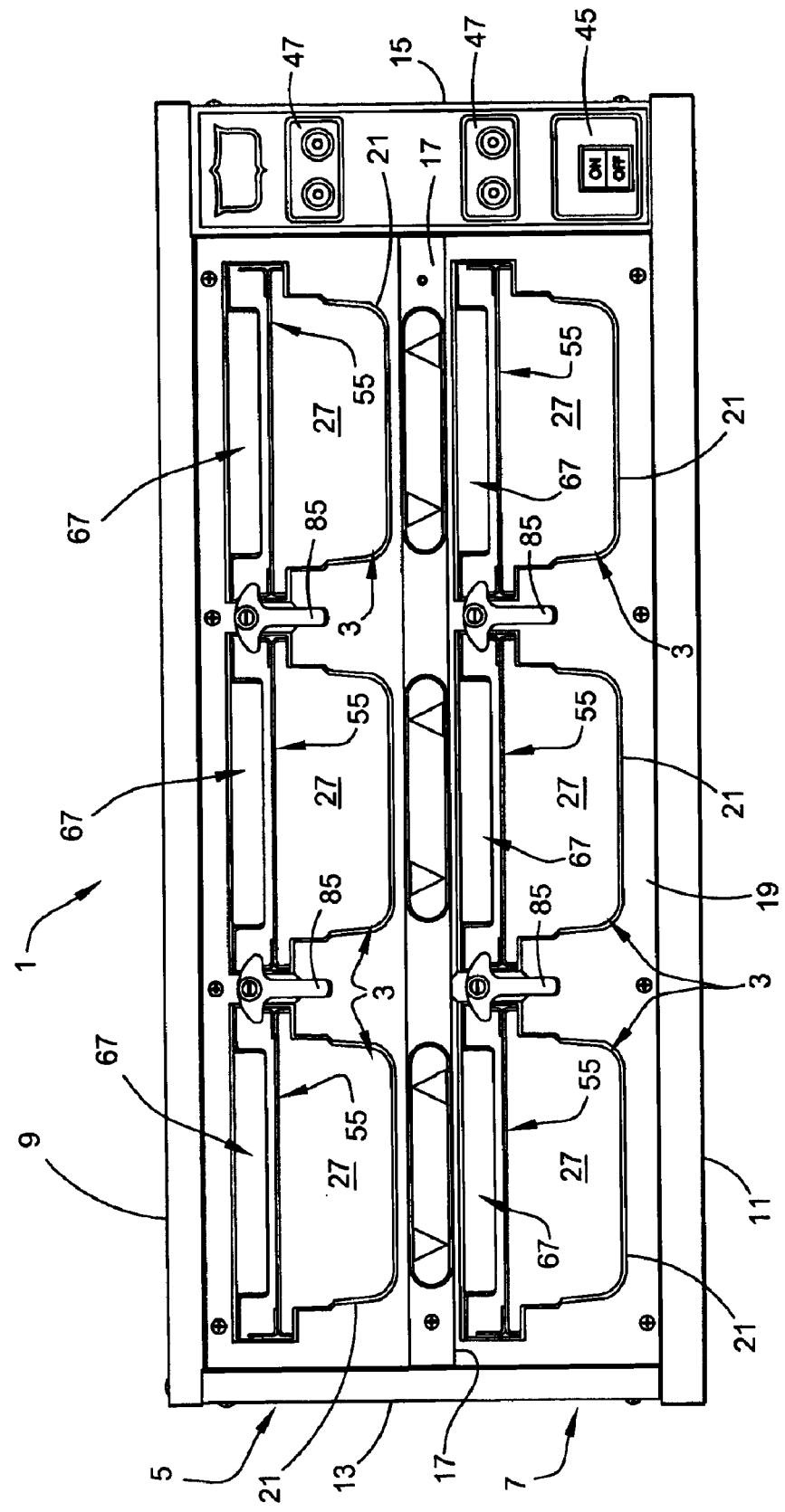
FIG. 1 is a front elevation of an oven of the present invention equipped with heat sinks for receiving food-containing trays, auxiliary heat sources mounted above the heat sinks, and metallic covers for covering the trays (the trays being omitted from the view)

FIG. 1 illustrates one embodiment of a holding oven of the present invention, generally designated 1, comprising a cabinet having an interior 12 comprising a plurality of tiers for removably receiving a plurality of trays, each generally designated 3, the trays in each tier being disposed side-by-side. As shown, the oven has two tiers, an upper tier 5 and a lower tier 7, each accommodating three trays. It is to be understood that the number of tiers and the number of trays in each tier may vary.

The holding oven 1 has a top 9, bottom 11, sides 13 and 15, and a shelf 17 extending from one side to the other generally midway of the top and bottom. The shelf 17 and top 9 define the upper tier 5; the bottom 11 and shelf 17 define the lower tier 7. The oven has a front panel 19 and a corresponding rear panel (not shown) each having openings such as indicated at 21 for sliding each tray 3 either into or out of its respective tier front or rear.

Figure 2:
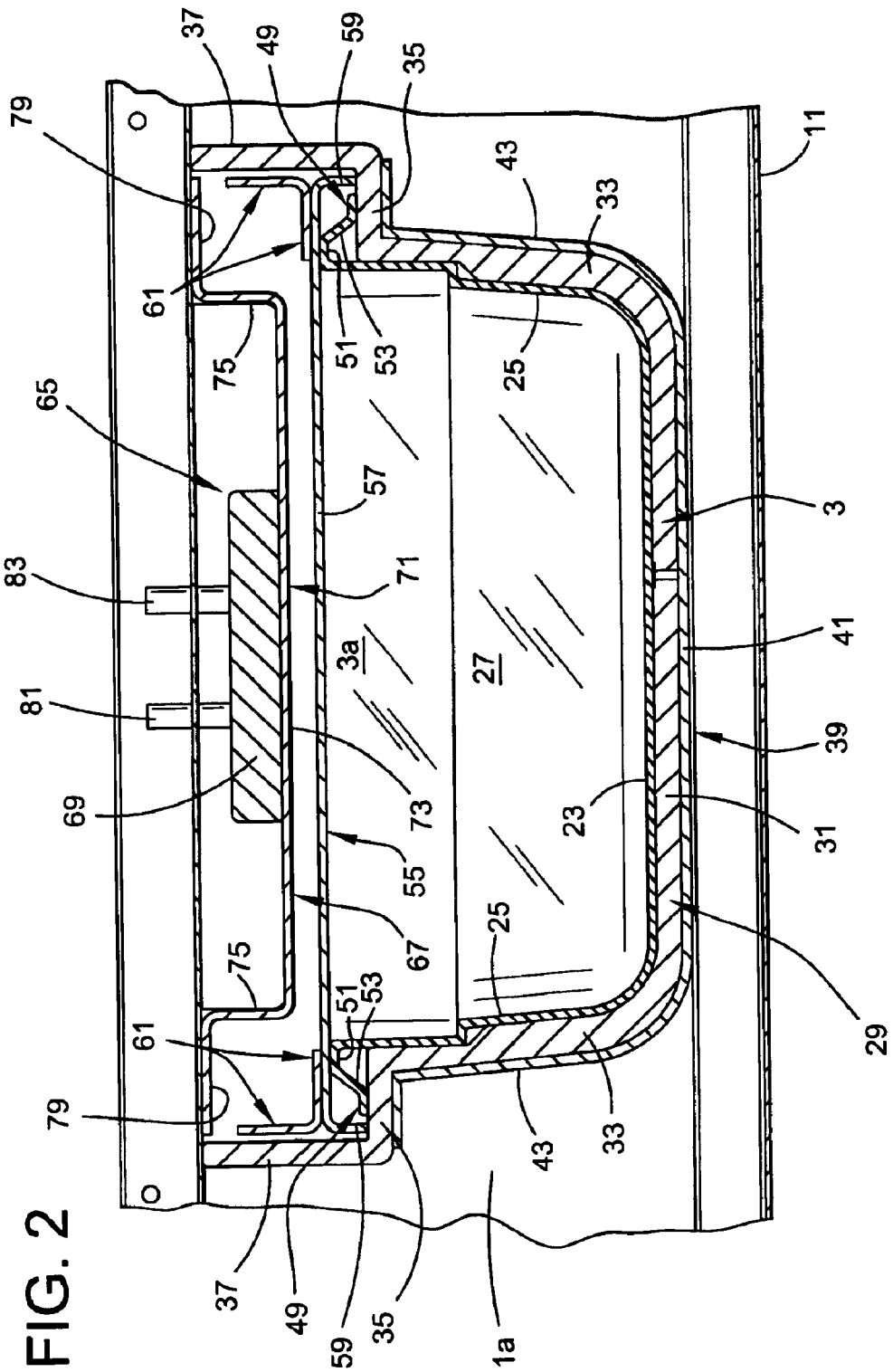
FIG. 2 is an enlarged sectional view of a portion of FIG. 1 but showing a tray positioned in a respective heat sink below its cover.
Figure 3:
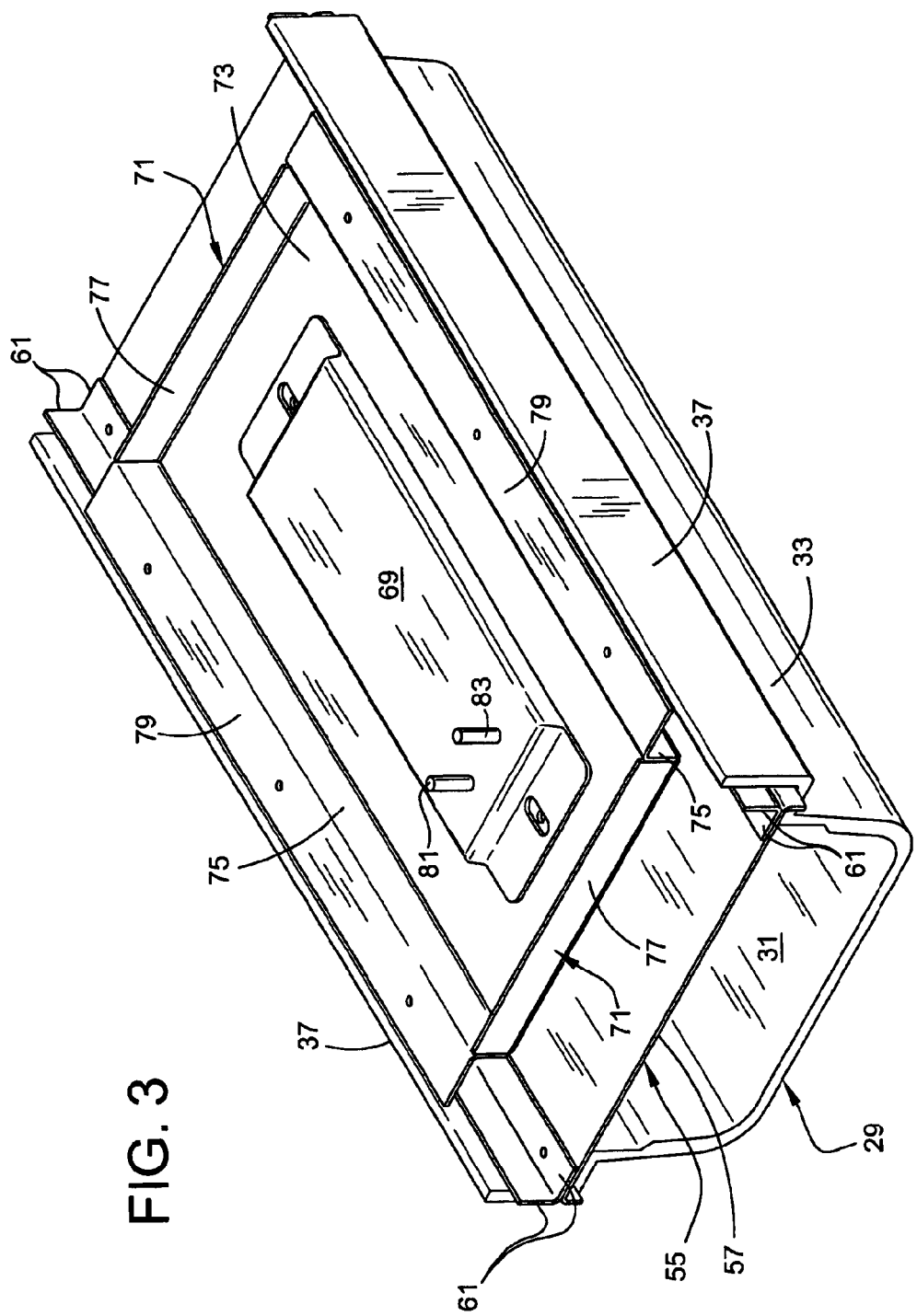
FIG. 3 is a perspective showing a heat sink, cover and auxiliary heat source.

In one embodiment, each tray 3 is generally rectangular in plan, having a bottom 23, opposite side walls each designated 25, and end walls each designated 27. Each tray is disposed in its respective tier 5, 7 in the oven 1 in a heat sink generally designated 29 extending from front to rear in the respective tier, being slidably disposed in its heat sink for being slidably withdrawn from or entered in the heat sink either front or rear through the respective opening 21. Each heat sink 29, which is made of aluminum, for example, has a bottom 31 and side walls each designated 33 (FIG. 2). The side walls 33 have outwardly (laterally) extending flanges 35 and rims 37 extending up from the outer margins of the flanges. Each heat sink constitutes a tray-receiving member for holding a single tray. An electrical resistance heating element generally designated 39 having a bottom component 41 contacting the bottom of the heat sink and upwardly extending side components 43 contacting the sides of each heat sink is provided for heating the heat sink and the tray 3 therein. Each heat sink 29 and associated heating element 39 constitutes the primary heating source for heating the respective tray 3 and its food content. At 45 is indicated an on-off electrical power control for all the heating elements 34. At 47, are indicated temperature controls for the heating elements 39 in the upper and lower tiers. The bottom component 41 of each heating element 39 in the upper tier 5 seats on shelf 17, the bottom component 41 of each heating element 39 in the lower tier 7 seats on the bottom 11 of the holding holding oven 1. The sides 43 of each heating element extend up to the flanges 35 of the respective heat sink 29. Reference may be made to U.S. Pat. Nos. 6,175,099, 6,262,394 and 6,541,739, incorporated herein by reference, assigned to Duke Manufacturing Co. of St. Louis, Mo., for further details relating to the construction of the heat sink 29 and associated equipment.

Primary heating sources other than the heat sinks 29 and associated heating elements 39 can be used without departing from the scope of this invention.

Figure 4:
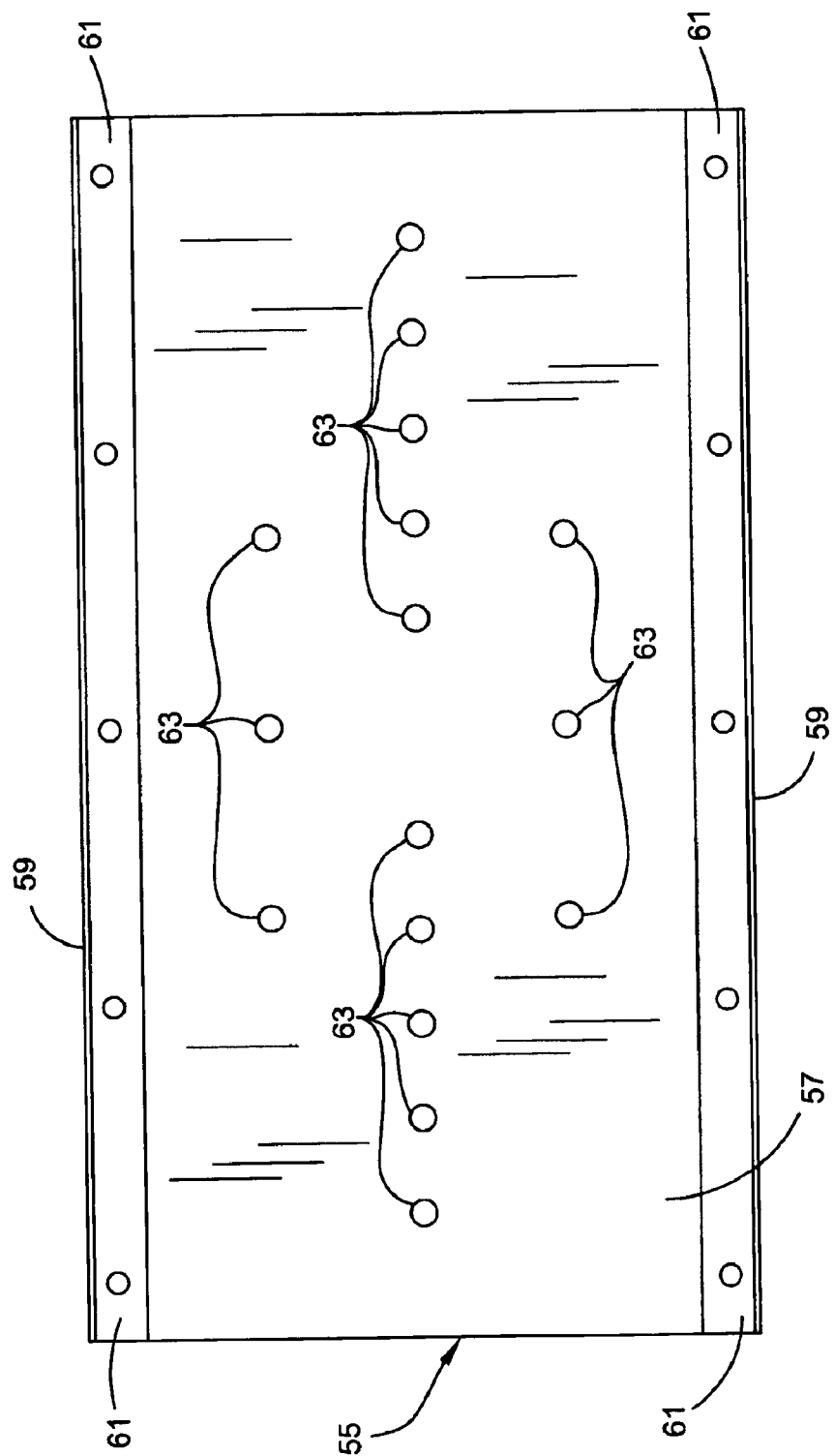
FIG. 4 is a plan of a cover per se.

In the preferred embodiment, each tray 3 has a rim 49 having an outwardly (laterally) directed upper part 51 with a downwardly extending angled lip 53 in sliding sealing engagement with the respective heat sink flange 35. The rim defines the open top 32 of the tray 3. A cover generally designated 55 is provided for the open top of each tray, each cover having a metallic portion 57 overlying the top of the respective tray. More specifically, the metallic portion 57 of each cover comprises a generally horizontal cross wall comprising a rectangular plate of anodized aluminum sheet, for example, having downturned flanges such as indicated at 59 at each side thereof and anodized metal angles 61 extending the length thereof on each side margin. The lower edges of the downturned flanges 59 engage the top of the heat sink flanges 35. One or more of the covers 55 is/are spaced above the rims 49 of respective trays 3 at a distance no greater than one inch, more preferably no greater than about 0.40 inch, and still more preferably no greater than about 0.30 in. One or more openings such as indicated at 63 is/are provided in at least one of the covers 55 for venting moisture from each tray having such an opening or openings. FIG. 4 shows a cover having sixteen openings 63 arranged in a pattern such as illustrated. The number and pattern may vary widely; the area of the one opening in a cover having one opening and the combined area of the openings in a cover having more than one opening is preferably less than about 25% of the area of the open top of the tray 3 it is covering, more preferably less than about 5% and even more preferably less than 1% thereof. The combined areas of the openings and the specific pattern of openings in a cover will vary depending on the type and quantity of food in the tray being covered. Whatever the circumstances, the size and pattern of the opening(s) can be selected to closely control the amount of moisture vented from the tray and thus optimize the conditions for maintaining food quality over an extended period of time.

Each cover 55 is part of a system generally designated 65 for heating the food in the respective tray in addition to the primary heat source, e.g., the respective heat sink 29 and heating element 39. This auxiliary heating system 65 comprises a heat source 67 for heating the metallic portion 57 of the respective cover 55 whereby the metallic portion is adapted to emit radiant heat to the food in the respective tray for additional warming of the food in the tray 3. Each heat source 67, which is located over the respective cover 55, comprises one electric heating element 69 or more disposed in a sheet metal housing 71 affixed to an interior surface of the oven or cabinet 1. In particular the heating element 69 is a commercial item, viz., a Chromalox electrical resistance heater element sold by Carlton Company of St. Louis, Mo. The housing 71 comprises a shallow pan of sheet metal such as aluminum having a rectangular bottom 73, sides 75, ends such as indicated at 77 and flanges 79 extending out from the top of the sides.

In one embodiment, the heating element 69 lies on the bottom 73 of the pan extending lengthwise thereof. It is suitably connected in an electrical circuit such that it is adapted to heat the respective cover 55 by heating the bottom 73 of the pan 71 with attendant emission of heat from the bottom of the pan to the cover. Terminals of the heating element for connection thereof in the aforesaid circuit are indicated at 81 and 83. The pans 71 are affixed in the oven or cabinet with the bottom 73 of each pan 71 spaced above the respective cover 55 a distance less than 2.0 inches and more particularly less than about 1.0 inch. In one embodiment, the power delivered by each heat source 67 to the respective cover 55 ranges from 100–500 watts, for example, and each heat source 67 is operable to heat each cover 55 to a temperature which preferably ranges from 200° to 500° F. Pivoted locks for locking the covers 55 in the oven 1 are indicated at 85.

Figure 5:
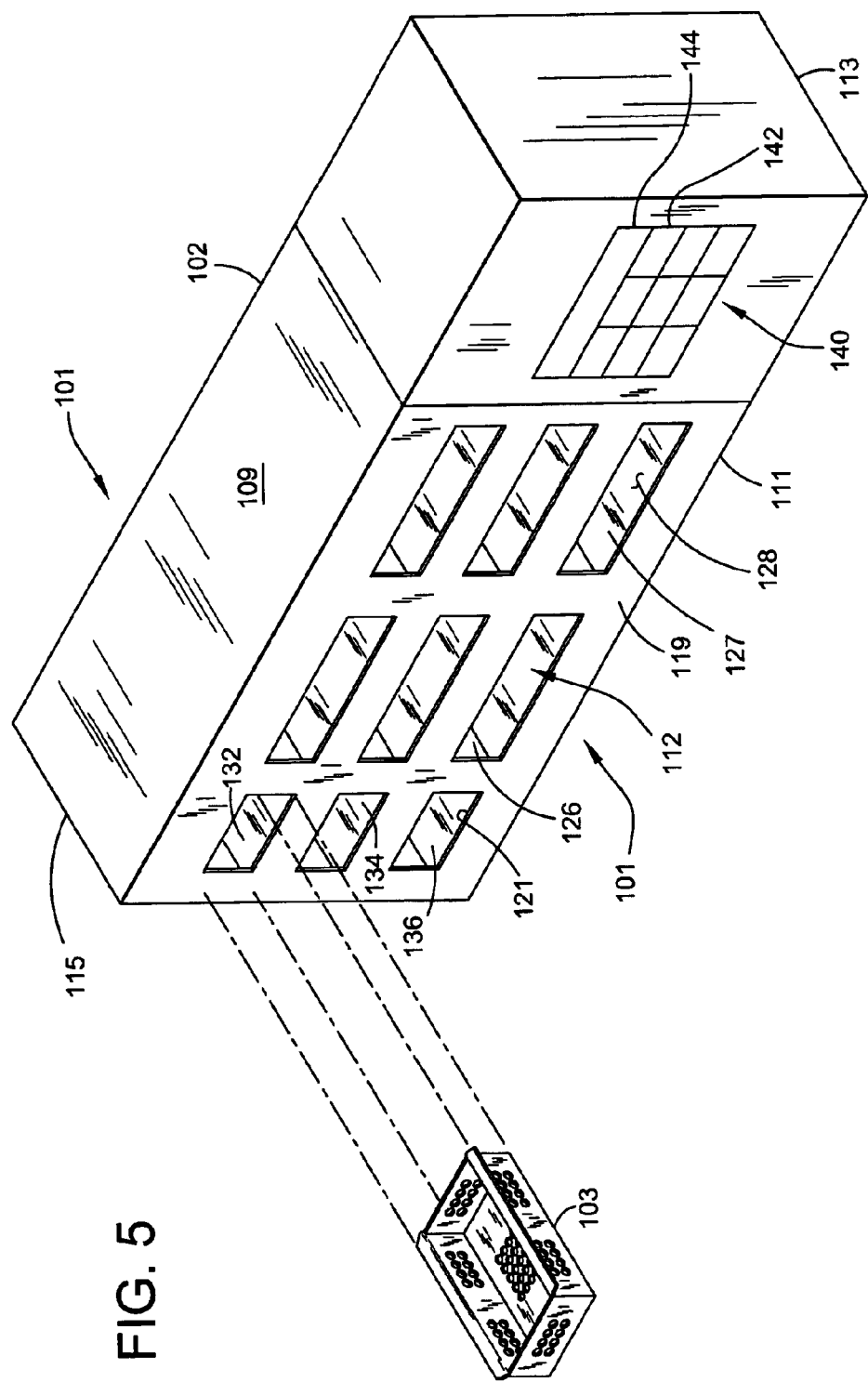
FIG. 5 is a front perspective view of another embodiment of an oven of the present invention equipped with compartments for receiving food-containing trays.

FIG. 5 illustrates a second embodiment of a holding oven of this invention, generally designated 101, comprising a generally rectangular or box-shaped cabinet 102. The cabinet 102 has a top 109, a bottom 111, opposite sides 113 and 115, a front panel 119 and a corresponding rear panel (not shown). The cabinet 102 defines an interior, generally designated 112, for removably receiving a plurality of trays, each generally designated 103. The holding oven 101 has vertical partitions 126 and horizontal partitions 127 within the cabinet 102 dividing the interior 112 thereof into a plurality of separate, thermally isolated holding compartments 128. It is to be understood that the number of vertical and horizontal partitions 126 and 127 (and thus the number of compartments 128) may vary. Preferably, the partitions 126 and 127 prevent the transfer of food flavors between the compartments 128.

The front panel 119 and rear panel contain openings, such as indicated at 121, in communication with each compartment 128. In one embodiment, the openings 121 in the front panel 119 have corresponding openings (not shown) formed in the rear panel such that each compartment 128 extends from front to rear of the oven 101 and is adapted for removably receiving one of the trays 103 from either the front or the back of the holding oven 101. The openings 121 are sized for sliding each tray 103 either into or out of the compartment 128.

Preferably, the compartments 128 and corresponding openings 121 are arranged in several tiers of compartments. As shown in FIG. 5, the holding oven has three horizontal tiers, an upper tier 132, a middle tier 134 and a lower tier 136. Each tier includes three compartments 128, with each compartment accommodating an individual tray 103. It is to be understood, however, that the number of tiers and the number of compartments in each tier may vary. In some embodiments, for example, it may be desirable to configure the holding oven 101 to have a single tier having two, three, or more compartments 128. Preferably, the entire cabinet 102 is fabricated of sheet metal material and a least the top 109, the bottom 111 and the sides 113 and 115 are of a dual wall construction to insulate the interior 112.

The holding oven 101 includes a control mechanism, generally indicated at 140, for controlling operation of the oven 101. Preferably, the control mechanism 140 has an operator input device, which in one embodiment, comprises a keypad, indicated by reference 142, and a display, indicated by reference 144, to selectively allow the operator to interact with the control mechanism to control the environment, such as the temperature and/or air flow, in each compartment 128. The control mechanism may include a separate keypad for each compartment 128. Alternately, the operator input device can include dials, switches and the like known to those in the art. For example, rotatably mounted control dials mounted on the front panel 119 and movable in a push-and-turn fashion to any user-selected positions can permit operator input to the control mechanism 140. The control mechanism 140 may also include associated indicator lights (not shown) to inform an operator of the status of a particular compartment 128 or the food within the compartment, such as whether the temperature in the compartment is at a desired temperature or whether the food in the compartment is approaching or has exceeded the desired hold time. Further operation of the control mechanism 140 will be described below.

Figure 6:
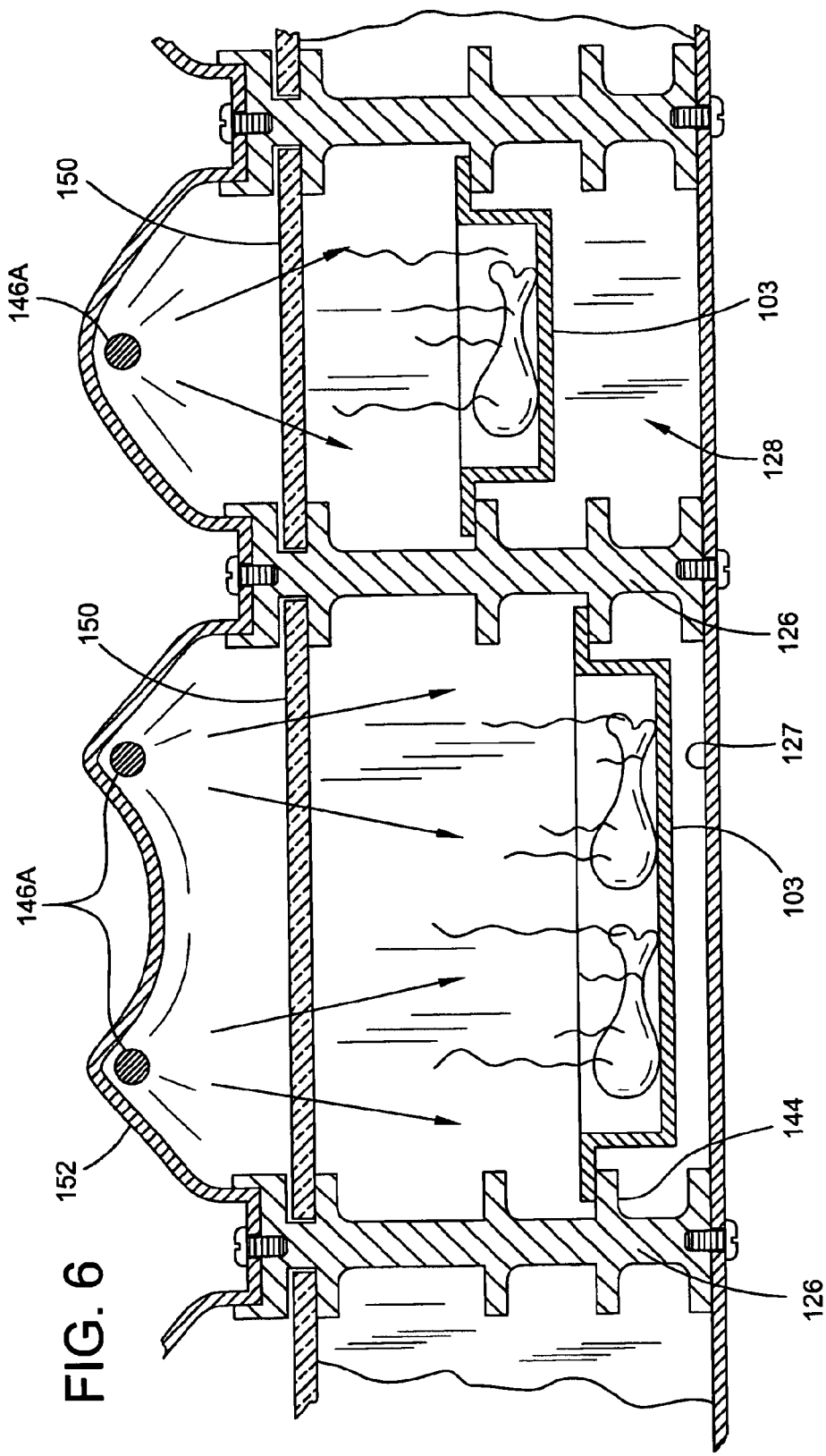
FIG. 6 is a sectional view of a portion of the oven of FIG. 5 showing trays positioned in respective compartments below heat sources.
Figure 7:
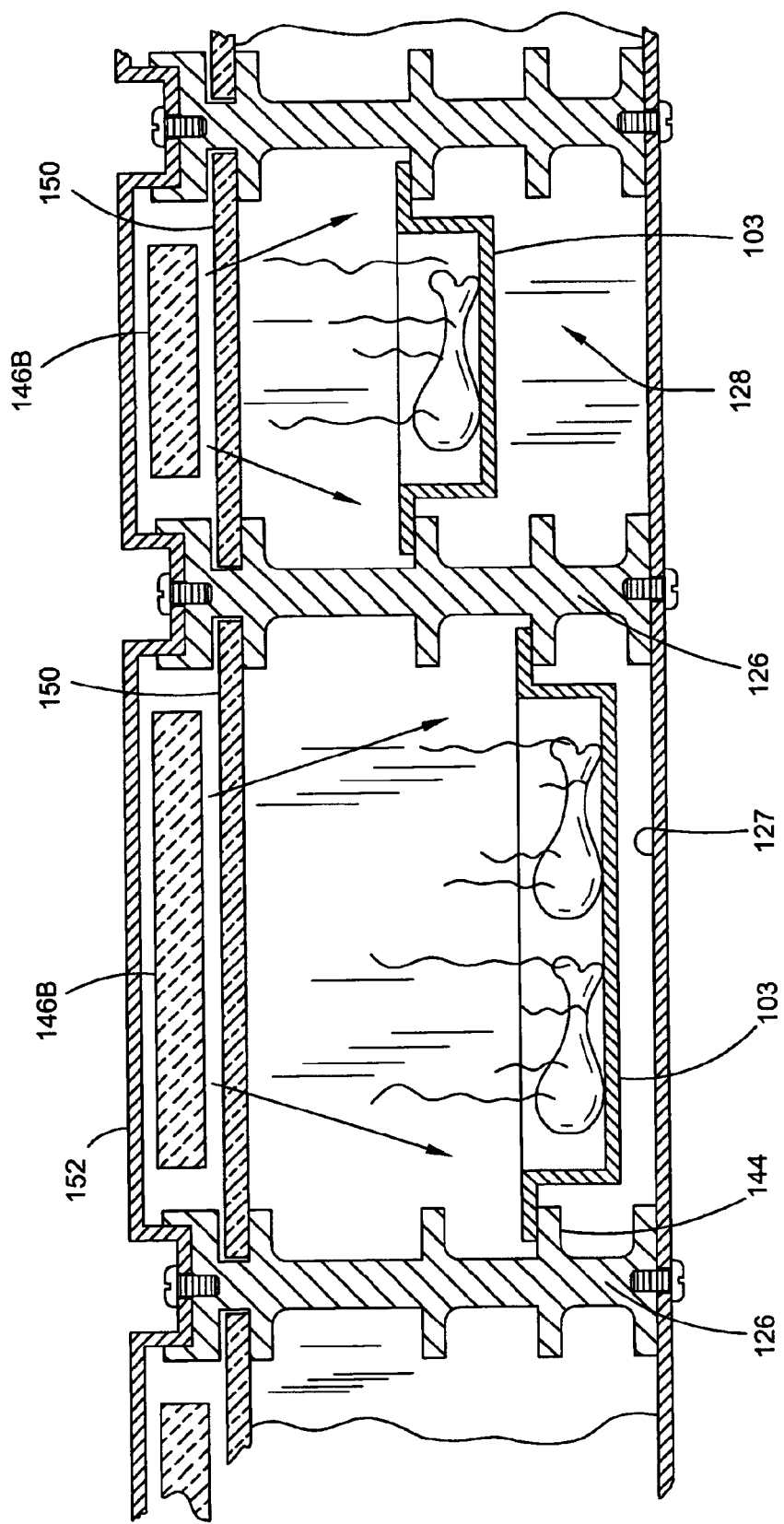
FIG. 7 is a sectional view of a portion of the oven similar to FIG. 6 showing trays positioned in respective compartments below alternate heat sources.
Figure 8:
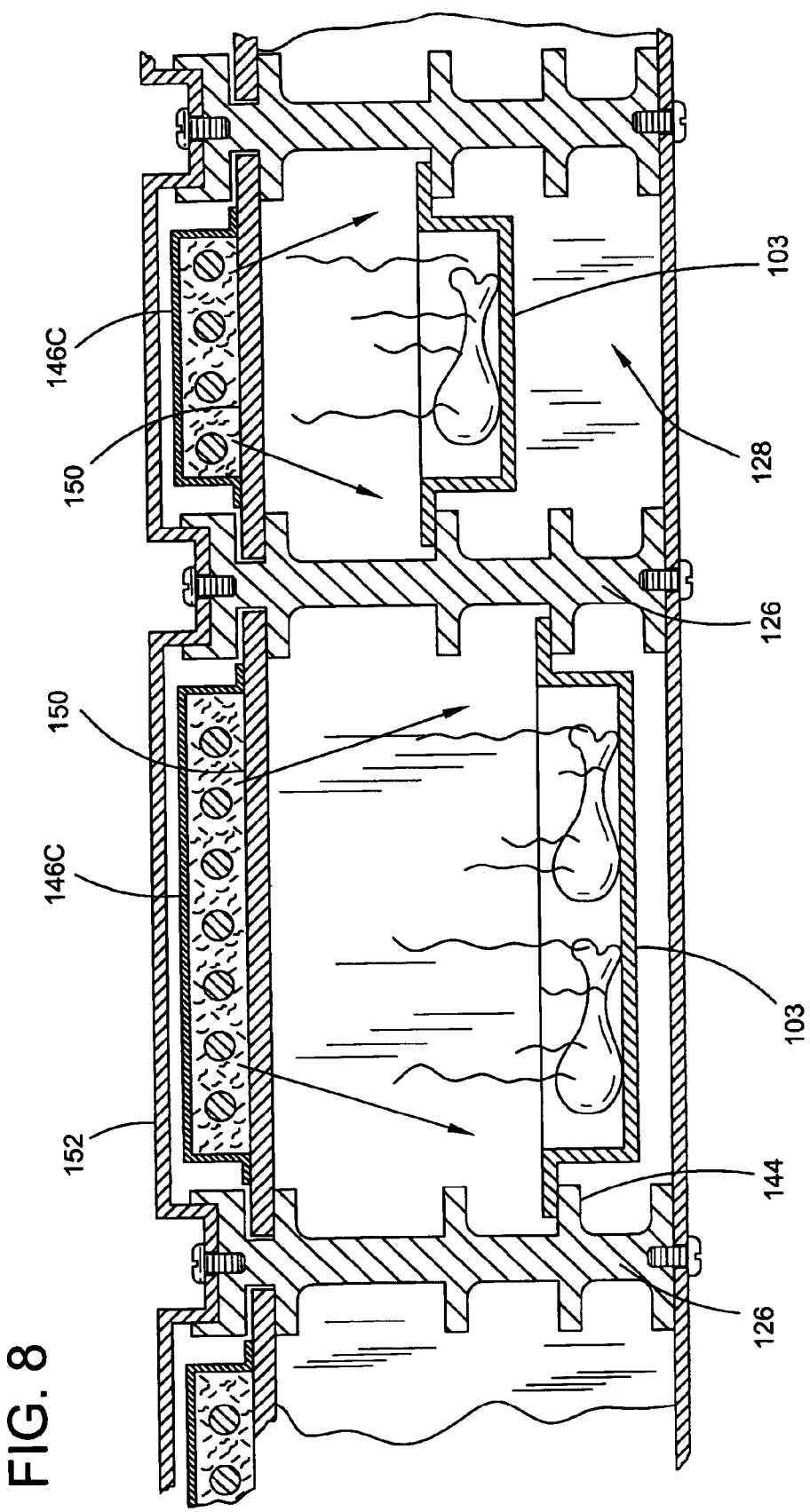
FIG. 8 is a sectional view of a portion of the oven similar to FIG. 6 showing trays positioned in respective compartments below alternate heat sources.

Referring to FIGS. 6–8, each compartment 128 has tray supports comprising, in one embodiment, inwardly (laterally) extending flanges 144 extending from the vertical partitions 126 at opposite sides of the compartment 128. The flanges 144 are vertically spaced for supporting a tray 103 at different elevations in the compartment 128. In one embodiment, the compartments 128 in the holding oven 101 have different widths and/or heights to accommodate trays of different sizes. It is contemplated that the tray supports can have other forms, such as grooves or slots in the vertical partitions 126.

Heat sources 146 positioned above respective compartments 128 are adapted to emit radiant heat into the compartments directed at the trays 103 to warm food contained therein. Each heat source 146 can function as the primary heating source for heating the respective tray 103 and cooking its food content or maintaining an already cooked food near a selected temperature. In the embodiment shown in FIG. 6, the heat source (designated 146A) is a quartz infrared heat source, but it will be understood that other heat sources may be used. For example, FIG. 7 illustrates ceramic infrared heat sources 146B and FIG. 8 illustrates resistance heating elements embedded in magnesium oxide 146C. Alternatively, halogen infrared heat sources or other sources may be used. The power delivered by each heat source 146 ranges from between about 20 and 2,000 watts, desirably between about 25 and 1500 watts, preferably between about 30 and 1000 watts, more preferably between about 35 and 750 watts and even more preferably between about 40 and 600 watts. In one embodiment, each heat source 146 delivers about 400 watts of power. Additional means for heating the holding oven 101 other than heat sources 146 can be used without departing from the scope of this invention. Reference may be made to the aforementioned U.S. Pat. Nos. 6,175,099, 6,262,394 and 6,541,739, for further details relating to the construction of certain types of equipment used for heating the trays 103 and food contained therein.

In one embodiment, a panel 150 is positioned between each heat source 146 and its respective compartment 128 to prevent the trays 103 and their contents from contacting the heat sources. In one embodiment, the panel 150 is a tempered glass cover that permits radiant energy produced by the heat source 146 to pass through into the compartment 128. In this embodiment, the panel is preferably made from transparent or semi-transparent glass. Alternately, the panel 150 can be a radiant metallic plate. In this latter embodiment, the heat source 146 is used to heat the panel 150, and the panel then radiates heat to warm the contents of the tray 103. A reflector 152 is positioned above the heat source 146 to radiate heat down toward the tray 103 below it.

Figure 9:
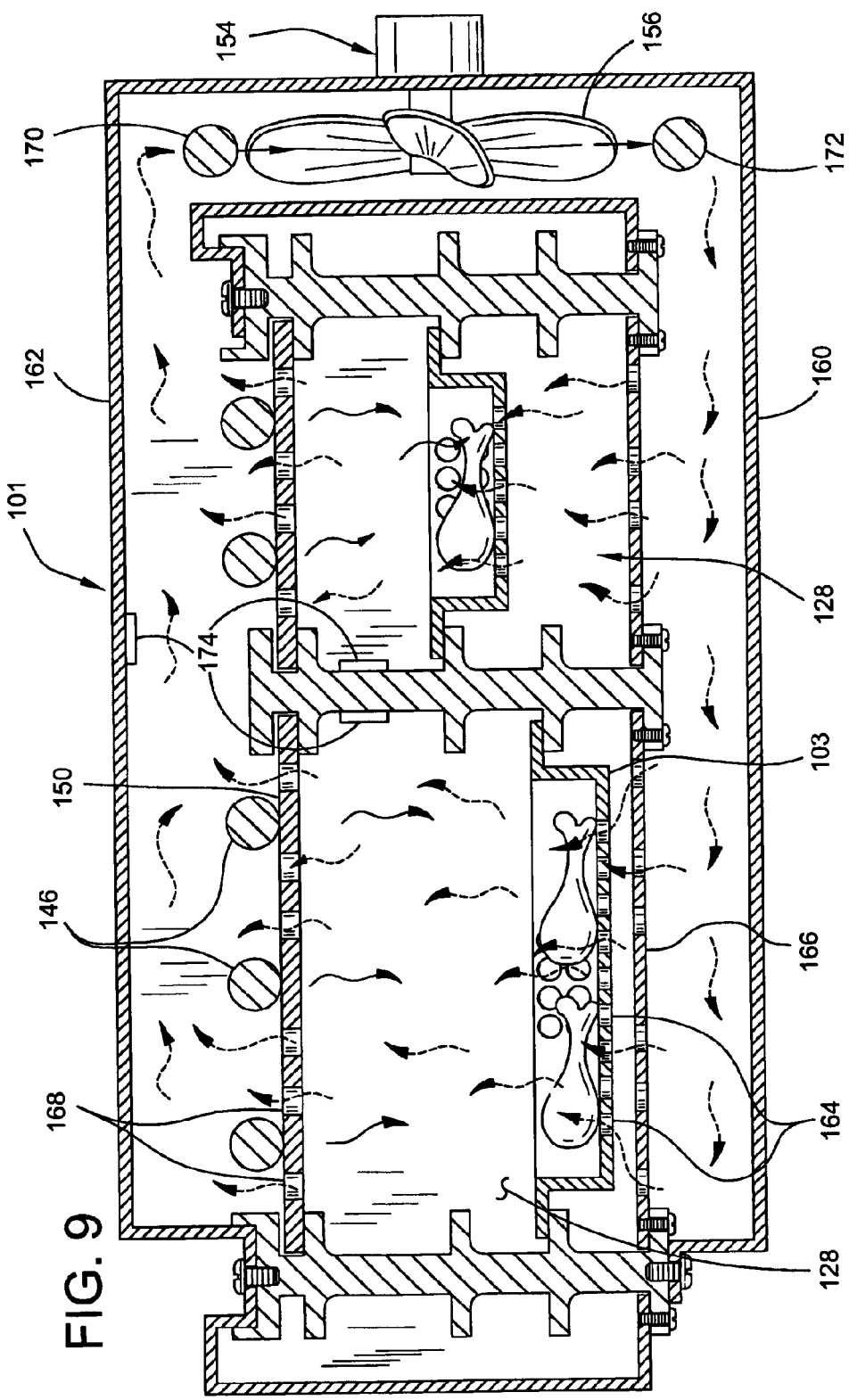
FIG. 9 is a sectional view of a portion of the oven of FIG. 5 showing a ventilation system of the oven according to an embodiment of the invention.

FIG. 9 illustrates an embodiment of the holding oven 101 having a forced air mechanism, indicated generally at 154, for delivering recirculating air into the compartments 128. The mechanism 154 comprises lower air ducting 160, upper air ducting 162, and a fan system 156 that moves air through the lower and upper air ducting air ducting. In one mode of operation, the fan system 156 circulates air in one direction along a flow path through the lower air ducting 160, into the compartments 128 and then through the upper air ducting 162 and back to the fan system. The lower air ducting 160 conveys the forced air into the compartments 128 through openings 164 located in a floor 166 of the compartments 128 below the trays 103. Air flows up from the compartments 128 into the upper air ducting 162 through one or more openings 168 in the panels 150 above the trays 103. In a second mode of operation, the fan system 156 moves air in the opposite direction through the upper air ducting 162, down into the compartments via openings 168, into the lower ducting 160 via openings 164, and then back to the fan system.

The number and pattern of openings 164, 168 in the panels 150 and floor 166 may vary widely depending on the type of heat source 146 used in each compartment 128 and the type of food in the compartment. The size and/or speed of the fan system 156 and/or the number, pattern and/or size of the openings 164, 168 associated with each compartment 128 can be varied to regulate the air flow around each tray 103 to provide optimum air flow for different food products. Additionally, the number, size and/or pattern of the opening(s) 164, 168 can be selected to closely control the amount of moisture vented from each compartment 128 and thus optimize the conditions for maintaining food quality over an extended period of time.

An upper duct heat source 170 and a lower duct heat source 172 are positioned in the respective air ducting 162,160 for heating air flowing along the selected flow path. The upper and lower duct heat sources 170, 172 heat the air that flows through the compartments so that, optionally, the food may also be warmed by convective heating. The duct heat sources 170, 172 are commercially available items, e.g., Chromalox electrical resistance heater element sold by Carlton Company of St. Louis, Mo. The duct heat sources 170, 172 may be used when additional heat is needed in the compartments 128, such as when the initial temperature is low or a large quantity of food is placed in the compartments. In one embodiment, temperature sensors 174 (FIG. 9), such as conventional resistive thermal detector type sensors known to those skilled in the art, may be positioned in each of the compartments 128 or in the air ducting 162, 160. The temperature sensors 174 provide feedback to the control mechanism 140, for example, to supply an indication of the temperature to the display 144, to control the operation of the fan system 156, or to provide indications to a warning system (not shown) that the temperature has exceeded a selected threshold. The forced air mechanism 154 can also provide recirculating air for forced cooling of the food stored in the compartment 128. FIG. 9 illustrates a holding oven with a single tier and a single forced air mechanism 154, but holding ovens 101 with multiple tiers can have separate fan systems with associated air ducting 160, 162 for each tier within the scope of the invention.

The air flow over the food in the tray 103 is controlled to enable an operator to control the amount of moisture that evaporates from the food. When the air flow direction is from the bottom to the top, i.e., from the lower air ducting 160 through the compartment 128 and into the upper air ducting 162, convection heat is applied to the food in the tray from below the tray, and infrared heat is applied from the heat sources 146 above the tray 103. By changing the direction of air flow so that air flows from top to bottom, the food can be cooked or held with a combination of convection heat and infrared heat directed from above the tray 103. Depending on the food in the tray, air flow can be maintained continuously from one direction, e.g., always from bottom to top, throughout the cook/hold cycle. Alternately, the direction of the air flow can be reversed during the cook/hold cycle so that air flow is alternately directed from the bottom and from the top of the food product. In one embodiment, the forced air mechanism 154 supplies air while the heat sources 146 are activated and is turned off when the heat sources are deactivated.

Figure 10:
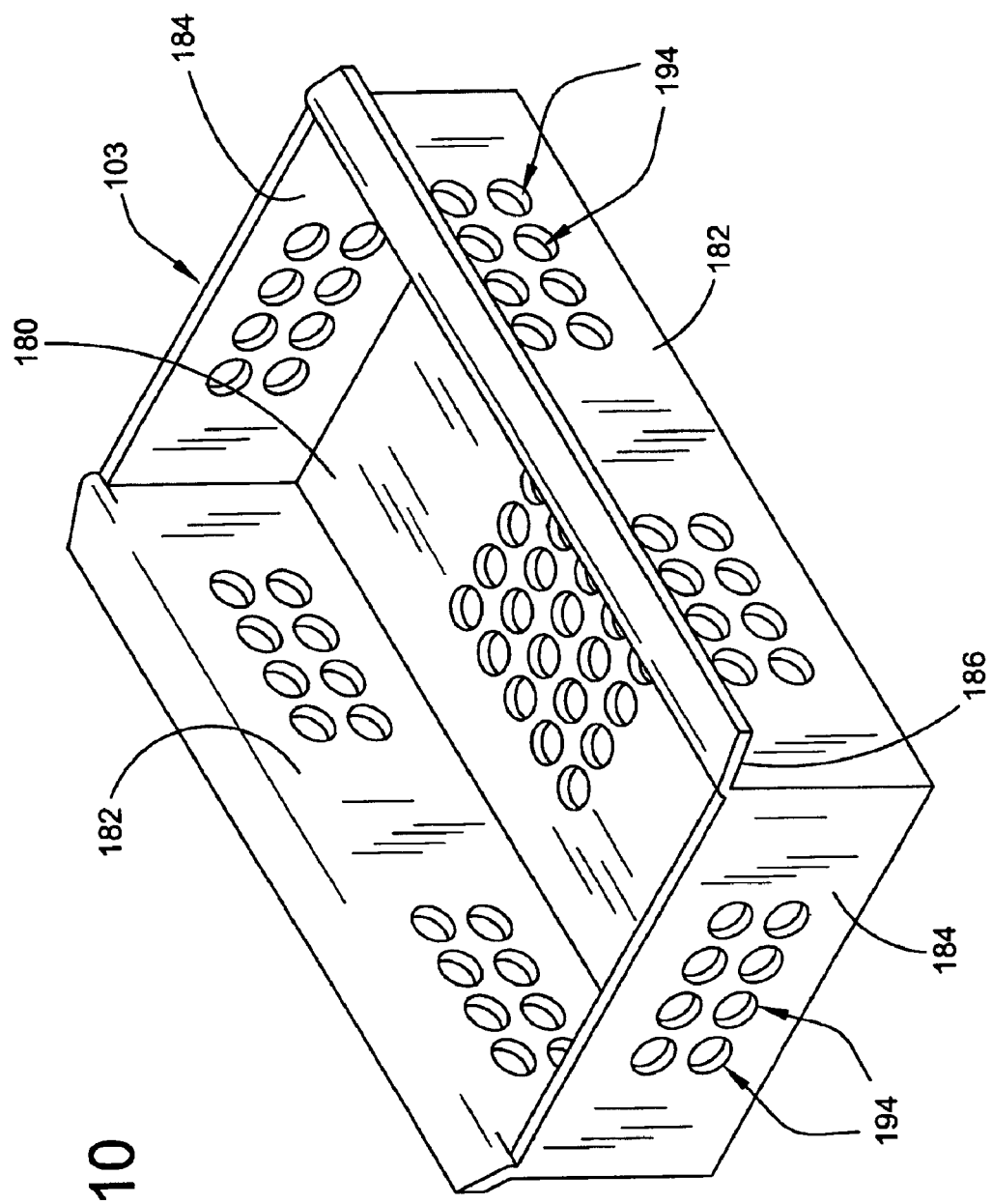
FIG. 10 is a perspective view of one embodiment of a tray used with the oven of FIG. 5.

Referring now to FIG. 10, each tray 103 is generally rectangular in plan, having a bottom 180, opposite side walls each designated 182, end walls each designated 184, and an open top. As shown, each tray 103 has a rim 186 comprising a pair of laterally extending lips 190 adapted for sliding sealing engagement with the respective support flanges 144 in a compartment. One or more openings such as indicated at 194 is/are provided in at least one of the bottom 180 and/or the side walls 182 and end walls 184 for allowing air to circulate through the tray 103 to vent moisture from each tray. FIG. 10 shows a tray having sixteen openings 194 in the bottom 180 and each side wall 182 and 8 openings 194 in each end wall 184 arranged in a pattern such as illustrated. It is contemplated that the number, pattern and size of openings 194 may vary widely. For example, the openings 194 in the tray 103 may be circular, oval, square or other shape and each opening may have an area of between about 0.1 and about 1.0 square inch. It is desirable that the combined area of the openings 194 in the tray is less than about 50% of the area of the open top of the tray 103, preferably less than about 25% and more preferably less than about 10% thereof. Also, it is contemplated that different trays 103 within the oven 101 may have different patterns of openings 194. The combined areas of the openings 194 and/or the specific pattern of openings in the tray 103 will vary depending on the type and quantity of food in the tray 103. Whatever the circumstances, the size and pattern of the opening(s) 194 can be selected to closely control the amount of moisture evaporated from the tray 103 and thus optimize the conditions for maintaining food quality over an extended period of time.

The control mechanism 140 is used to selectively control the environment, such as the temperature and/or air flow, in each compartment 128 of the holding oven 101. As will be described more fully hereafter, the control mechanism 140 is operable to vary the amount of radiant heat as needed to maintain the food at a desired holding temperature to preserve the quality of the food for a longer period of time. As used herein, the term "selected holding temperature" means either a single substantially constant temperature (e.g., 180° F.) or a range of temperatures (e.g., 160–180° F.). In one embodiment, the control mechanism comprises suitable timer and duty cycle controls to control the length of the duty cycle of each heat source 146, the term "duty cycle" meaning the ratio of heat source on-time to heat source on-time plus heat source off-time. The control mechanism 140 uses a suitable microprocessor and appropriate software to control relays 198 (FIG. 11) that activate the heat sources 146, 170 and 172 and fans 156.

Figure 11:
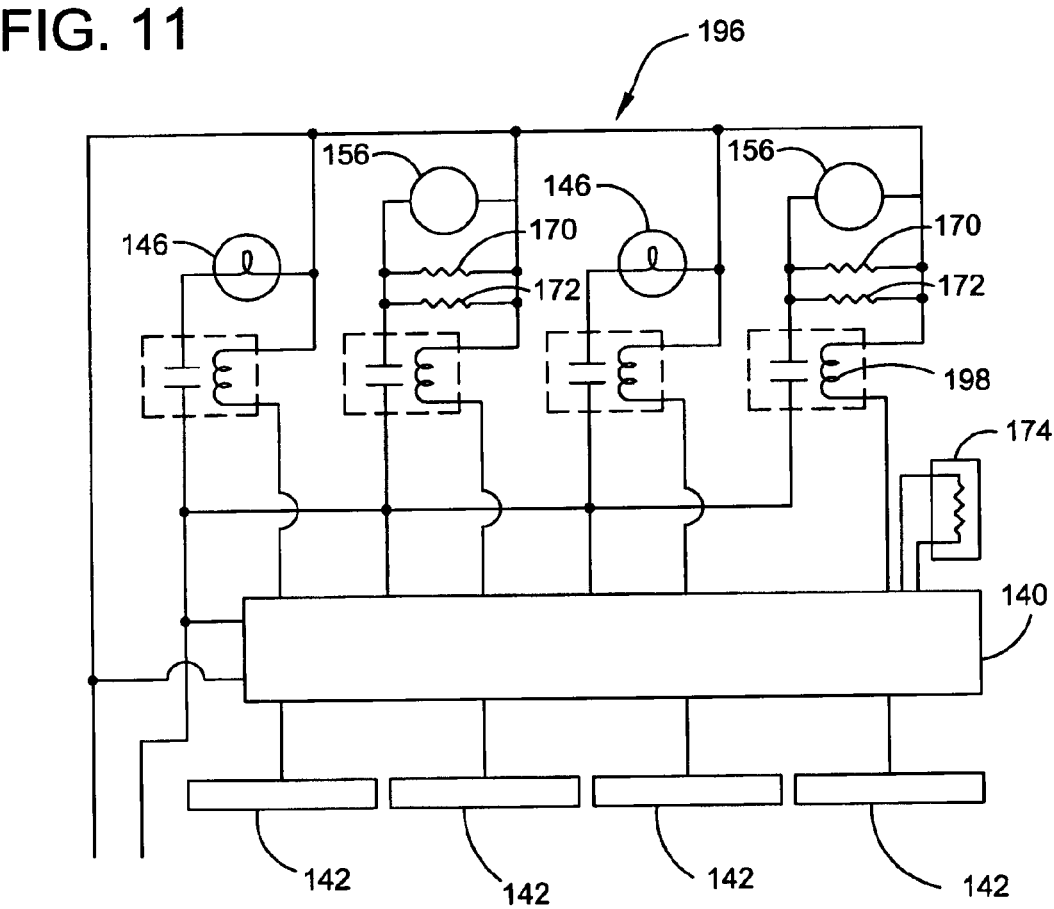
FIG. 11 is a schematic diagram of one embodiment of a control circuit of the oven of FIG. 5.

FIG. 11 is a simplified schematic of a portion of one embodiment of an oven control circuit, generally indicated at 196, that is controlled by the control mechanism 140. The circuit 196 operates the heat sources 146 in the multiple compartments 128 of the holding oven and the heat sources 170, 172 in the upper and lower ducting 160, 162. In the embodiment shown, the control mechanism 140 regulates the heat sources in the holding oven 101 by energizing conventional relays 198. It is understood that the control mechanism 140 may independently operate the heat sources 146 in the compartments 128, such that the heat source 146 for one compartment may be actuated while the corresponding heat source for another compartment is at a different level of activation or deactivated. Additionally, the control mechanism 140 may independently operate the upper and lower duct heat sources 170, 172 such that neither, one or both heat sources in a flow path may be operating, and such that, for example, the top heat source may be operated in one tier while the bottom heat source may be operated in another tier. Using a keypad 142 or other suitable operator input device, the control mechanism 140 can be programmed to control the heat sources 146, 170 and 172 to adjust various parameters, such as, for example, the ambient hold time, the heated hold time, the total hold time, the percentage heater on time, the time base of the duty cycle, the cook or rethermalization time, and/or the temperature, as more fully described below. As such, the control mechanism 140 controls operation of the heat sources 146 independent of one another so that the temperature in each compartment 128 may be independently controlled.

Typically, the holding oven 101 will operate in at least two modes. In a first "cool down and hold" mode, the initial temperature of the food placed in the holding oven is higher than the desired holding temperature of the food, as is typically the case when the food has just been cooked in a cooking appliance (e.g., cooking or baking oven, frier, etc.) and then is transferred to the holding oven. In this mode, the control mechanism 140 is operable to maintain the heat source in a respective compartment 128 deactivated (or at a low level of activation) while the pre-cooked food in the compartment 128 cools down to the selected holding temperature during a duration of non-heated holding time, and for then controlling the heat source 146 in the compartment 128 to maintain the food in the compartment 128 at or near the selected holding temperature for a duration of heated holding time. In a second "heat up and hold" or "rethermalizing" mode, the initial temperature of the pre-cooked food placed in the oven is lower than the desired holding temperature of the food, as where the food has been cooked and then refrigerated before placement in the holding oven. In this mode, the control mechanism 140 is operable to activate the heat source in the compartment 128 to raise the temperature in the compartment 128 to the selected holding temperature during a duration of rethermalizing holding time, and for then controlling the heat source 146 in the at least one compartment 128 to maintain the food in the compartment 128 at the selected holding temperature for the duration of heated holding time. It will be understood that the oven 1 of FIG. 1 can be used in a similar manner without departing from the scope of the invention.

Figure 12:
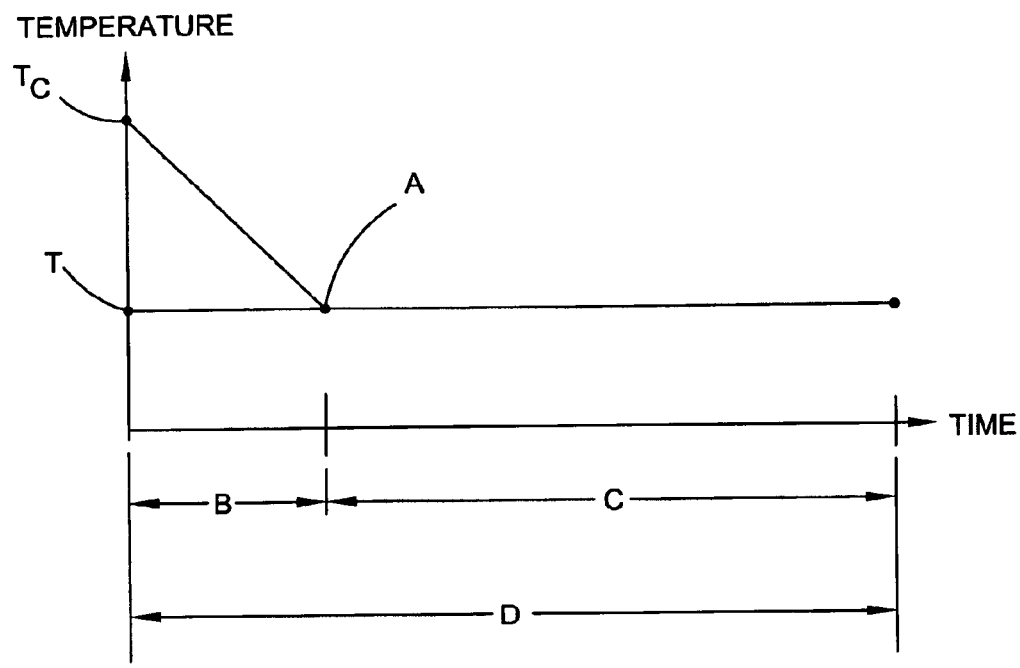
FIG. 12 is a diagram of a time vs. temperature curve illustrating one mode of operation of the oven of FIG. 5.
Figure 13:
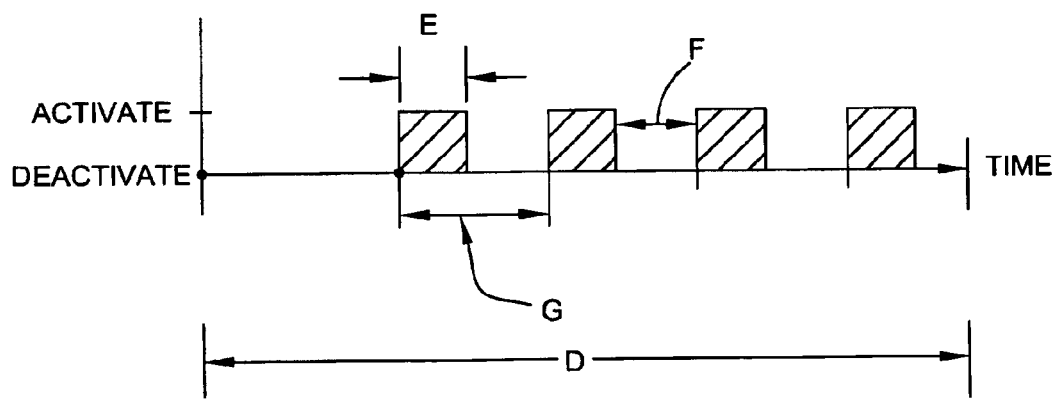
FIG. 13 is a time vs. heat source activation curve for the mode of operation depicted in FIG. 12.

FIGS. 12 and 13 illustrate an example of the operation of the holding oven 101 in the first (cool down and hold) mode. In particular, FIG. 12 illustrates a time vs. temperature curve for a complete duration of holding time D for one compartment 128 of the oven 101, and FIG. 13 illustrates a time vs. activation curve for the heat source 146 of that same compartment during the holding time duration D. The time vs. temperature curve of FIG. 12 plots the temperature of the food product as a function of time. One skilled in the art will understand that this curve can be different for each type of food product to be held in the oven 101.

In a cool down and hold situation, a food product is typically cooked as by frying, grilling, baking, etc., in a cooking appliance until a desired high internal temperature, usually between about 170 and 210 degrees Fahrenheit (° F.), is achieved. After the food is cooked, the food product is placed in a tray 103 and inserted into compartment 128 in the oven 101. Alternatively, the food can be placed in the oven without the use of a tray. Using the keypad 142 or other input device, the operator selects a desired holding temperature, indicated at T, which will be lower than the temperature Tc of the food initially placed in the compartment. The holding temperature T is the desired temperature for maintaining the pre-cooked food to preserve taste, appearance and/or other food quality. The operator also selects a duration of holding time D. The duration of holding time D is the total time the food is to be held in the oven 101 and maintained at a desired quality level. Alternatively, the control mechanism 140 can be programmed so that the operator need only select the type of food to be placed in the compartment and the control mechanism 140 automatically uses preselected settings for that type of food.

In general, when the holding oven is operating in the cool down and hold mode, it is desirable that food introduced into the oven be allowed to quickly cool down to the selected holding temperature, and that the food be held at this temperature thereafter. Thus, the duration of holding time D may comprise an ambient hold time, i.e., a period of non-heated cool-down time such as indicated at B in FIG. 12, during which time the food product is allowed to cool to the desired holding temperature T. Preferably, during the ambient hold time B, heat source 146 is either in a deactivated state or a state in which it is delivering a relatively low quantity of radiant heat to the food so that the food product may cool down more rapidly than if the heat source was at full power. The food product is allowed to cool for the ambient hold time B until it reaches the desired hold temperature T as illustrated at point A. In one embodiment, forced air flow from the forced air mechanism 154 (FIG. 9) can be used to more rapidly decrease the temperature. After the internal temperature of the food decreases to the desired hold temperature T, the food is held near the desired hold temperature to preserve food quality for a period of heated hold time, indicated at C, comprising the remaining portion of the holding time duration D. During the heated holding time C, the heat source 146 may be operated in duty cycles to apply the appropriate amount of radiant heat to the food. Additionally, the control mechanism 140 controls the heat sources 170, 172 and the fan system 156 to maintain the internal food temperature at or near the desired hold temperature T during the heated hold time C.

FIG. 13 illustrates an embodiment in which the heat source 146 is successively activated and deactivated in a controlled sequence or duty cycle, indicated at G, to maintain the temperature in the compartment 128 near the selected holding temperature T. In this particular embodiment, each duty cycle G comprises a heating interval E during which time the heat source 146 is activated followed by a non-heating interval F during which time the heat source is deactivated. The time-base of the duty cycle G is the time required to complete one cycle of activation and deactivation of the heat source 146 as shown in FIG. 13.

In one embodiment, the time-base of the duty cycle G and the percent on time of the heat source 146 (i.e., the duration of heating interval E divided by the time-base of the duty cycle G expressed as a percent) maintains the actual temperature within the compartment 128 within at least about 15 degrees of the desired temperature, preferably within at least about 10 degrees, more preferably within about 5 degrees, and even more preferably within about 2 degrees of the desired temperature.

The operator is able to set various parameters using the keypad 142 or other input device of the control mechanism 140, such as the ambient hold time delay B, the heating interval E, the time-base of the duty cycle G, and/or total hold time D. These parameters can be selected by the operator or preset for the type of food product in the compartment 128 so that the operator need only select the proper food product. The control mechanism 140 in an oven 101 having more than one compartment 128 can control the duty cycle of the heat source 146 in each compartment to maintain the temperatures in the compartments at different levels.

Using the keypad 142 or other input device, an operator can also control the operation of the forced air mechanism 154 (FIG. 9) by activating the fan system 156 or selecting the direction of forced air flow. In one embodiment, forced air flow from the forced air mechanism 154 conveys convective heating air into the compartments 128 at locations below the trays 103 for flow in a generally upward direction toward the trays 103. Alternately, the ventilation system conveys heating air into the compartments 128 at locations above the trays 103 for flow in a generally downward direction toward the trays 103. The fan system 156 can be operated such that heating air is circulated through the compartments 128 in one direction and then the direction of air flow is reversed to circulate heating air through the compartments 128 in the opposite direction. Using the keypad 142 or other input device of the control mechanism 140, the operator is able to select the duration that the fan system 156 circulates air through the compartments 128. For example, in one embodiment, the forced air mechanism 154 operates in a controlled sequence during the duty cycle G such that the fan system 156 is activated when the heat sources 146 are activated and is deactivated when the heat sources are deactivated. Alternately, the fan system 156 can be continuously activated for the duration of the total hold time D or can be activated so that the fan system is on a desired percentage of the duty cycle G independent of the heat sources. Preferably, the fan system 156 is activated a suitable percentage of the time to control the evaporation of moisture from the food in the compartment 128. The percentage of time the fan system 156 is activated desirably depends on the type and/or the amount of food placed in the compartment 128. The percentage of time the fan system 156 is activated and the direction of air flow can be selected by the operator or preset for the type of food product in the compartment 128 so that the operator need only select the proper food product. Additionally, the vertical position of at least one tray 103 in a respective compartment 128 may be varied.

Set forth below are exemplary oven settings for particular food products when the oven is operating in a cool down and hold mode.

EXAMPLE 1

Fried Chicken Nuggets

| | |
|---|---|
| Ambient hold time delay (B) = | 10 minutes |
| Hold temperature (T) = | 180° F. |
| Time-base of duty cycle (G) = | 120 seconds |
| Percent on time (E) = | 50% |
| Total hold time (D) = | 60 minutes |

EXAMPLE 2

Fried Apple Turnover

| | |
|---|---|
| Ambient hold time delay (B) = | 25 minutes |
| Hold temperature (T) = | 200° F. |
| Time base of duty cycle (G) = | 120 seconds |
| Percent on time (E) = | 40% |
| Total hold time (D) = | 240 minutes |

Figure 14:
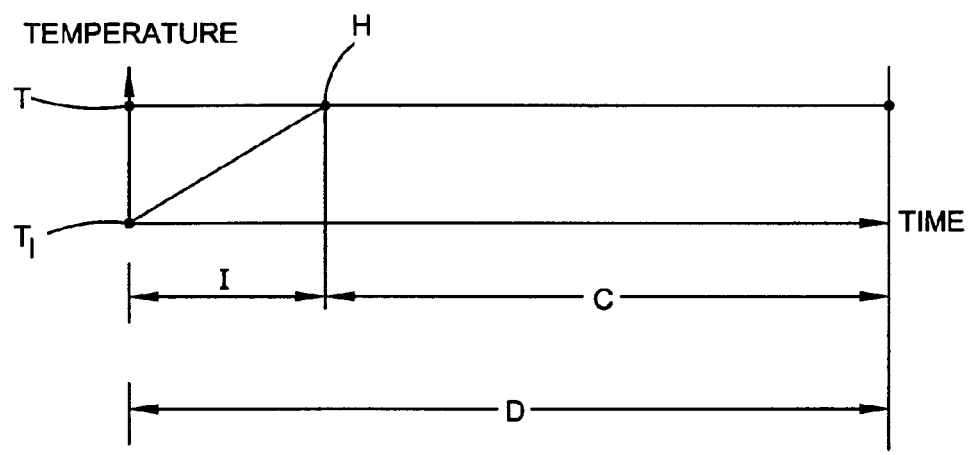
FIG. 14 is a diagram of a time vs. temperature curve illustrating a different mode of operation of the oven of FIG. 5.
Figure 15:
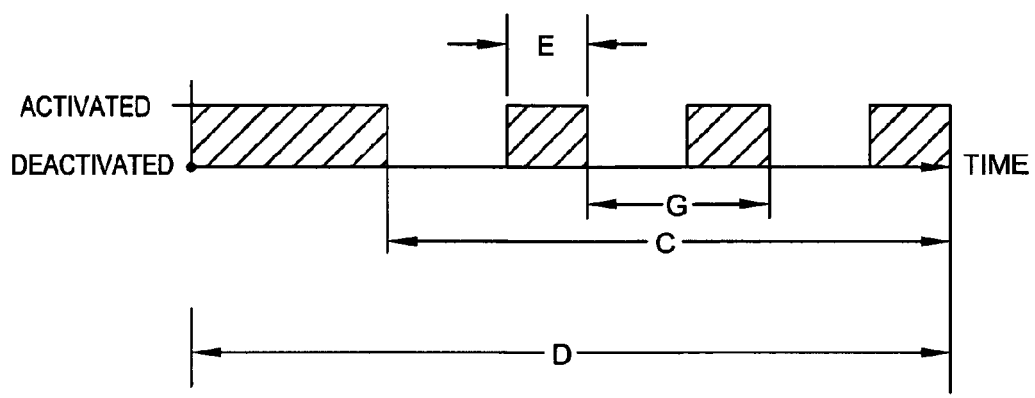
FIG. 15 is a time vs. heat source activation curve for the mode of operation depicted in FIG. 14.
Figure 16:
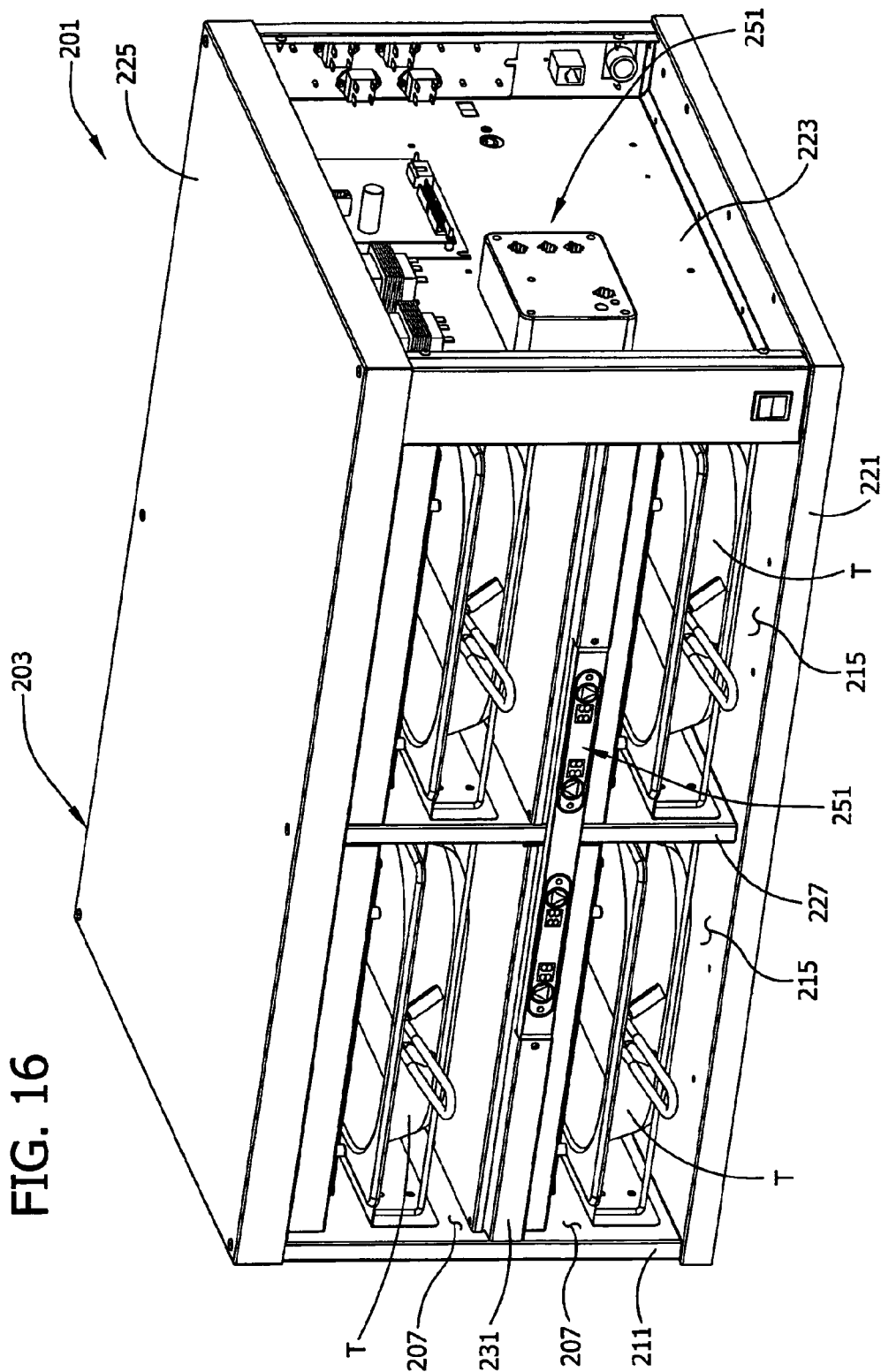
FIG. 16 is a perspective of a different embodiment of a holding oven of this invention.
Figure 17:
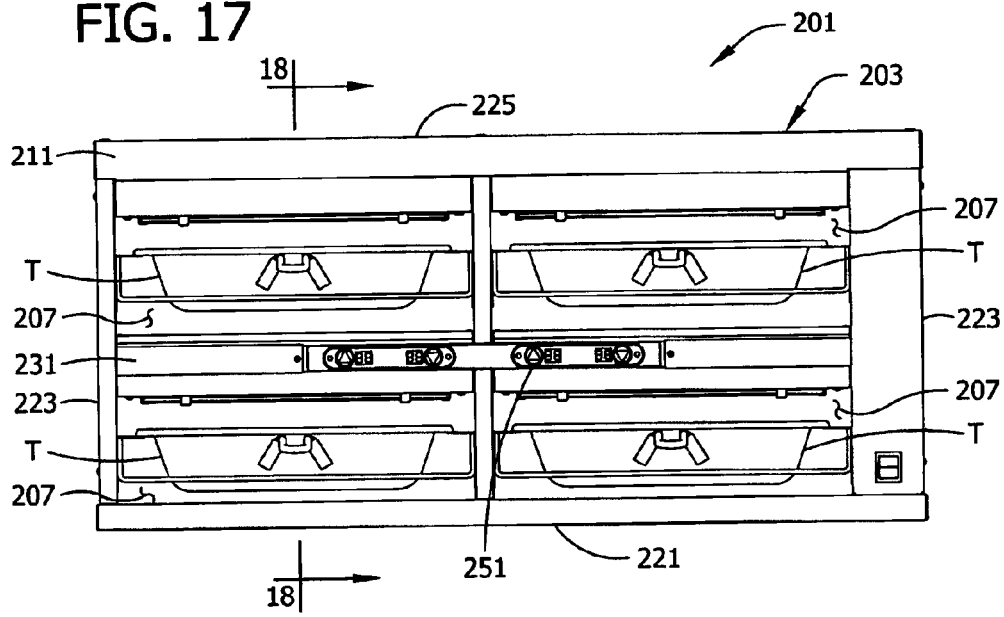
FIG. 17 is a front elevation of the holding oven of FIG. 16.
Figure 18:
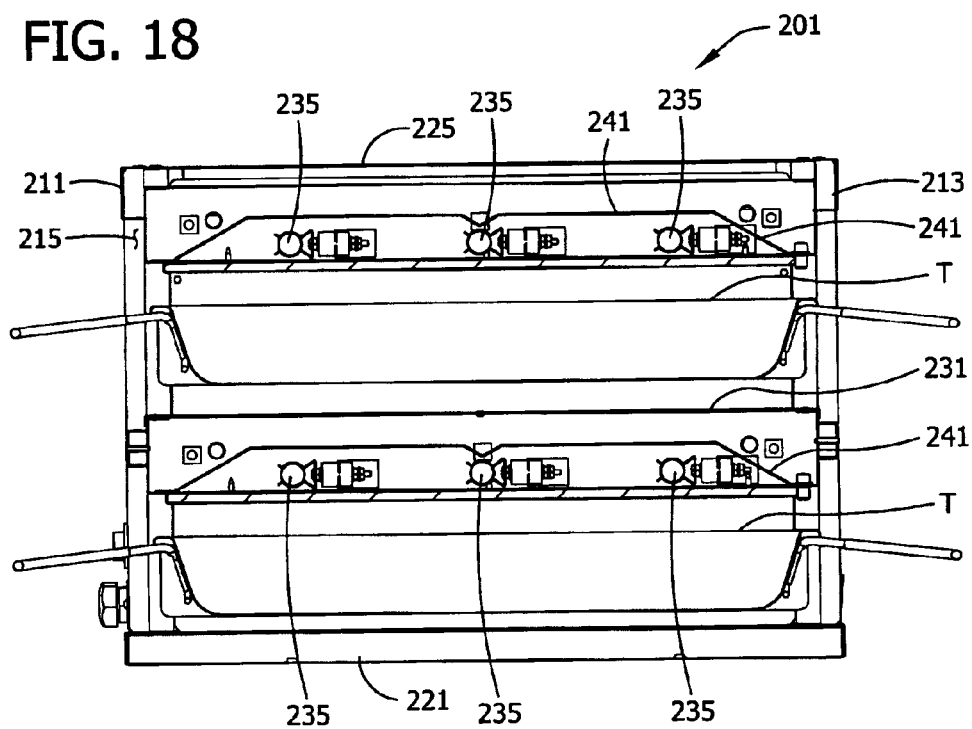
FIG. 18 is a section on line 18—18 of FIG. 17.

FIGS. 14 and 15 illustrate an example of the operation of the oven 101 in the second (heat up and hold or rethermalizing) mode. In particular, FIG. 14 illustrates a time vs. temperature curve for a complete hold cycle D for one compartment 128 of the oven 101, and FIG. 15 illustrates a time vs. activation curve for the heat source 146 of that same compartment during the hold cycle D. The time vs. temperature curve of FIG. 14 plots the temperature of the food product as a function of time. One skilled in the art will understand that this curve can be different for each type of food product to be held in the oven 101.

In this mode, the oven 101 is used to raise the temperature of a food product to a selected temperature and hold the food product at the selected temperature. A tray 103 containing a food product at an initial temperature $T_I$ is placed into the compartment 128. (Temperature $T_I$ may vary from a frozen or refrigerated temperature to ambient or above.) Using the keypad 142 or other input device, the operator selects a desired holding temperature T (which will be higher than the initial food temperature $T_I$), and a duration of holding time D. Alternatively, the control mechanism 140 can be programmed so that the operator need only select the type of food to be placed in the compartment and the control mechanism 140 automatically uses preselected settings for that type of food. In either case, the control mechanism is operable to activate the heat source 146 to raise the temperature of the food product for a duration of heat-up or rethermalization time, indicated at I, the food reaching the holding temperature T at time H. The heat source 146 is then activated and deactivated during the heated holding time C for successive duty cycles G to maintain the food in the compartment 128 at the selected holding temperature T for the duration the total hold time D. In one embodiment, the duration of the heated holding time C includes intervals of the duty cycle G when the heat source 146 is activated as indicated by E and intervals during which the heat source is deactivated as indicated by F as described above.

Set forth below are exemplary oven settings for particular food products when the oven is operating in a heat-up and hold mode.

EXAMPLE 3

Diced Frozen Chicken

| | |
|---|---|
| Rethermalization time (I) = | 40 minutes |
| Hold temperature (T) = | 220° F. |
| Time-base of duty cycle (G) = | 180 seconds |
| Percent on time (E) = | 50% |
| Total hold time (D) = | 160 minutes |

EXAMPLE 4

Refrigerated Beef BBQ

| | |
|---|---|
| Rethermalization time (I) = | 30 minutes |
| Hold temperature (T) = | 210° F. |
| Time base of duty cycle (G) = | 180 seconds |
| Percent on time (E) = | 30% |
| Total hold time (D) = | 240 minutes |

With the heating system of the present invention and the capability of controlling the evaporation of moisture from the trays 103, the holding time (D) for fast service cooked foods such as chicken and french fries is substantially increased, and good texture and taste are maintained. In this respect, controlling the rate of evaporation of moisture from chicken, for example, precludes drying out and toughening of the chicken fibers and precludes the breading from becoming dry and greasy. And with respect to french fries, for example, development of a dry, rubbery texture as moisture is lost and the outer skin loses crispness is precluded.

In the embodiments described above, the control mechanism 140 uses a duty-cycle system to control the amount of radiant heat delivered to the pre-cooked food by the heat sources. In this type of system, the percentage of heater on and off time is adjusted to vary the radiant energy as needed to maintain the food at the suitable holding temperature. It will be understood, however, that the control mechanism 140 can vary the amount of radiant energy delivered to the food in other ways. For example, the heat sources 146 may be variable-power heaters operable to deliver radiant heat at multiple discrete energy levels or at an infinite number of levels between full-power and zero power (as by varying the voltage to the heaters), and the control mechanism 140 may operate to increase and decrease the radiant heat delivered by the heaters in a controlled, pre-programmed manner to maintain a particular food at its ideal holding temperature.

The particular program used by the control mechanism 140 to control a heat source 146 for any given type of food may be determined empirically. Alternatively, the control mechanism 140 can include one or more sensors and one or more appropriate feedback loops for each compartment or group of components of the holding oven. For example, in one embodiment, at least one sensor is used in each compartment to detect a characteristic indicative of the temperature of the food in the compartment, and the control mechanism is responsive to signals received from the at least one sensor to control the heat source 146 to vary the radiant heat delivered to the pre-cooked food to maintain it at a holding temperature appropriate for that food. The characteristic detected by the one or more sensors may be the temperature of the air in the compartment, or the temperature of a surface in the compartment, or the radiant IR energy emitted by the food in the compartment, or some other characteristic. Thus, the sensor may be a standard temperature sensor, or an IR emissions detector, or some other type of detector capable of detecting the aforesaid characteristic indicative of the temperature of the food in the compartment.

FIGS. 16–21 show another embodiment of food warming apparatus of this invention, generally designated 201. The apparatus comprises a cabinet 203 having two horizontal tiers of compartments, two compartments per tier (each compartment being designated 207). It will be understood that the number of tiers can vary from one to any number more than one, and that the number of compartments 207 in each tier may vary from one to any number more than one. In the particular embodiment shown, each compartment is sized to receive a single tray T, but it will be understood that each compartment 207 may be sized to receive more than one tray, or that some compartments may be sized to receive one tray and other compartments more than one tray. In other embodiments (to be discussed later), food is placed in one or more compartments 207 without the use of a tray.

The cabinet 203 has front and back panels 211, 213 with openings 215 aligned with the compartments 207 in the cabinet to allow food (either in or out of trays T) to be placed into the compartments and removed from the compartments from both ends of the compartments. The cabinet also has a bottom wall 221, side walls 223, a top wall 225, a vertical partition or divider 227 extending between the top and bottom walls of the cabinet to separate the two compartments 207 in each tier, and a horizontal partition or divider 231 extending between the side walls 223 to separate the compartments in the upper tier from the compartments in the lower tier. As a result, the interior of the cabinet is divided into a plurality of separate, thermally isolated holding compartments 207, and each compartment is completely enclosed on opposite sides, top and bottom so that food flavors are prevented (or at least inhibited) from transferring between compartments. Suitable thermal insulation (not shown) is provided adjacent the walls of each compartment 207.

Figure 19:
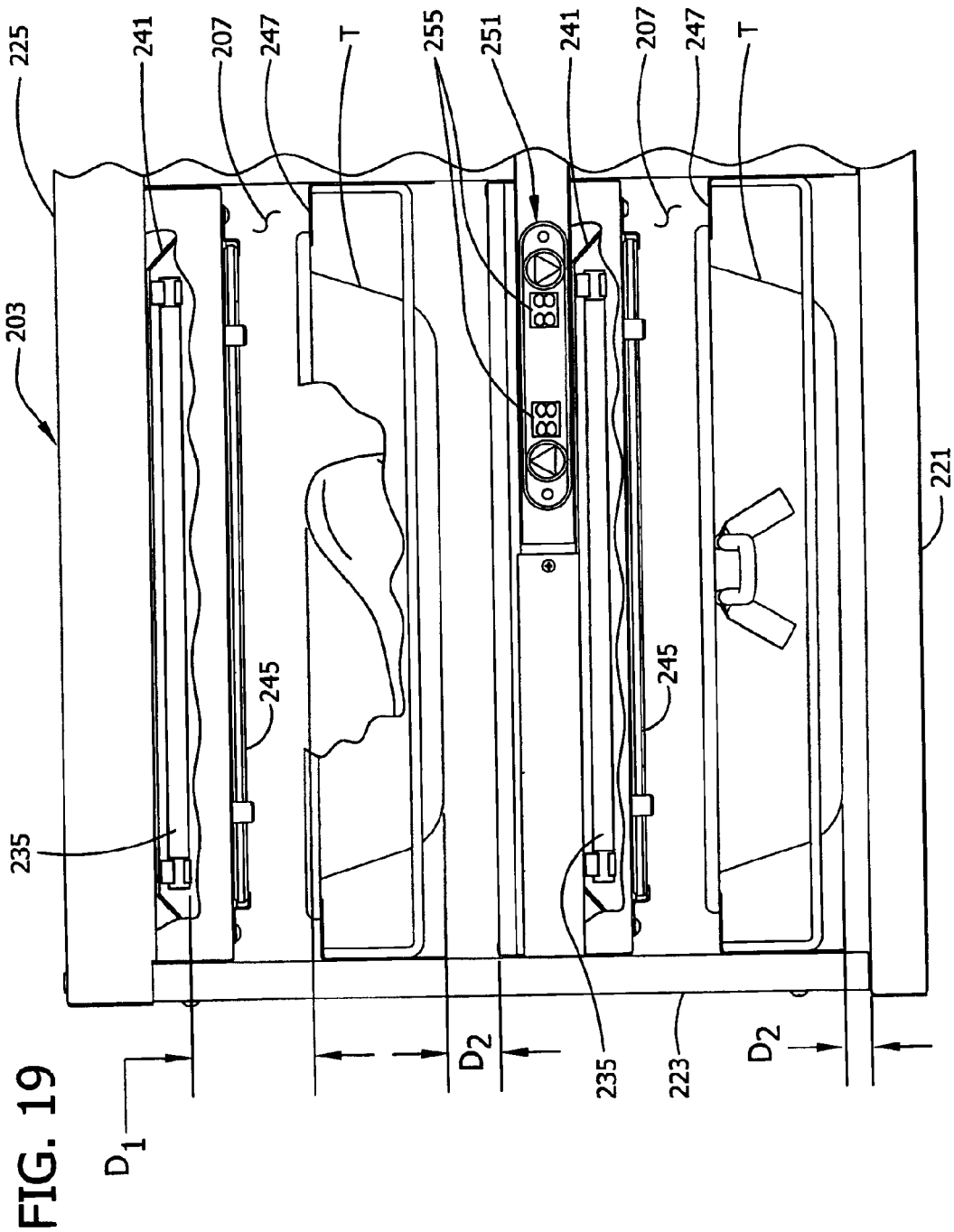
FIG. 19 is an enlarged portion of FIG. 17 with parts broken away to show the distance D1 between the food in the oven and a heat source of the oven.
Figure 20:
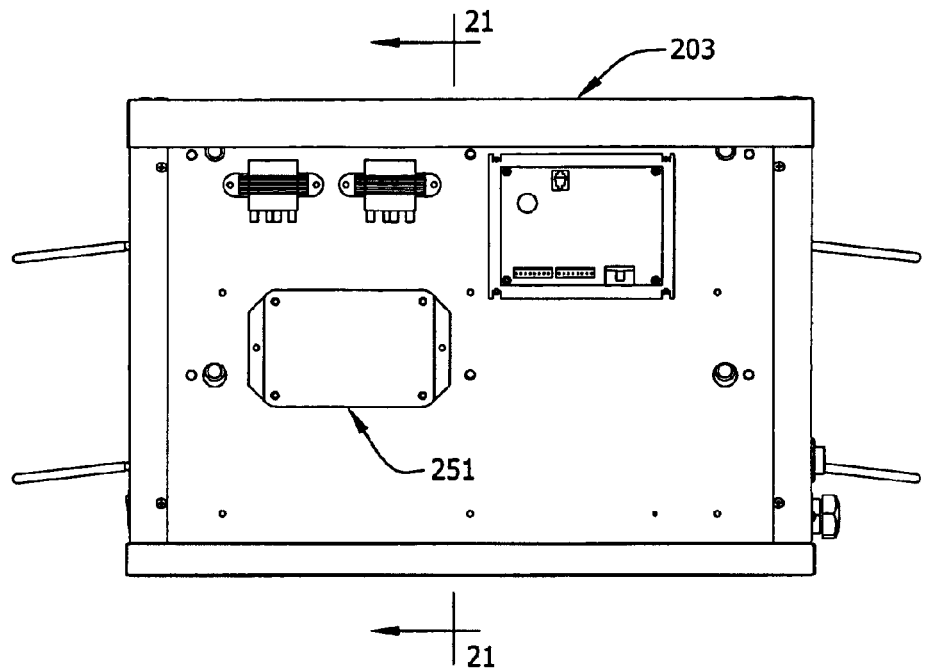
FIG. 20 is a right-side elevation of the holding oven of FIG. 16.
Figure 21:
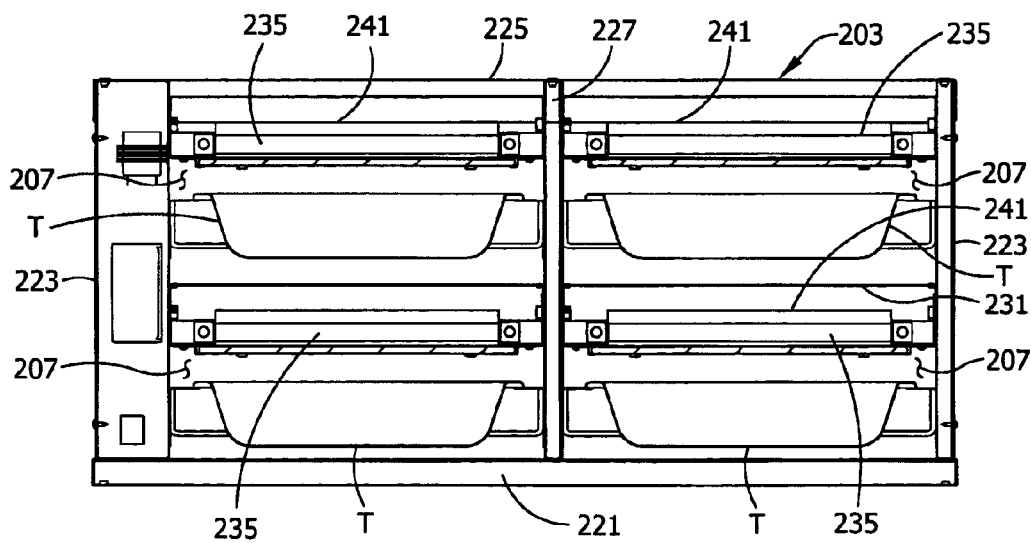
FIG. 21 is a section on line 21—21 of FIG. 20.

As shown in FIG. 19, for example each compartment 207 has a heat source 235 for emitting radiant heat down on pre-cooked food in the compartment. As noted previously, this heat source 225 may comprise one or more IR heat lamps or the like, each mounted by a suitable fixture adjacent to the top wall of the compartment. A reflector 241 is provided in each compartment 207 over the best source 235 for reflecting radiant heat in a generally downward direction through a cover panel 245 of suitable material capable of transmitting the heat (e.g., glass). The food in the compartment 207 is positioned a distance D1 below the heat source 235, as shown in FIG. 19. Distance D1 is desirably relatively small to reduce or minimize the size (e.g., vertical height) of the cabinet 203. In one embodiment, for example, distance D1 is less than 12 in.; in another it is less than 11 in.; in another it is less than 10 in.; in another it is less than 9 in.; in another it is less than 8 in.; in another it is less than 7 in.; in another it is less than 6 in.; in another it is less than 5 in.; in another it is less than 4 in.; in another it is less than 3 in.; in another it is less than 2 in.; in another it is less than 1 in.; and in another it less than 0.5 in. In other embodiments, distance D1 may be in the range of 0.25 in. to 10 in., or in the range of 0.25 in. to 8 in., or in the range of 0.25 in. to 6 in., or in the range of 0.25 to 4 in., or in the range of 0.25 to 3 in., or in the range of 0.25 in. to 2 in., or in the range of 0.25 in. to 1 in. Where the pre-cooked food is placed in one or more trays, as shown in FIG. 19, each tray T is supported by supports 247 in a respective compartment 207 at an elevation where the bottom of the tray is spaced above the floor of the compartment a suitable distance D2. Distance D2 may be in the range of 0–12 in., and more preferably 0.5–1.0 in. Alternatively, the food may be placed on the floor of the compartment.

The heat sources 235 in the cabinet 203 are controlled by a suitable control mechanism 251, similar to the control mechanism 140 described above, which can be used to operate each heat source 235 independently of the other heat sources to deliver varying amounts of radiant energy to the food in a respective compartment. In this manner, the amount of radiant energy delivered to the food in a compartment 207 can be closely controlled to maintain the food at an appropriate holding temperature for that particular food, as described above. Also, because the amount of radiant heat delivered to the food is varied as a function of time, the heat source 235 in each compartment 207 can be placed much closer to the food (e.g., distance D1 in FIG. 19, discussed above) which has the desirable advantage of reducing the size of the cabinet 203. This is in contrast to conventional IR holding units where the energy delivered by the heat source is not variable. Rather, the heat source is energized to deliver full power all of the time. As a result, the heat source must be positioned relatively far from the food (e.g., 12 in. or more).

In one embodiment, the control mechanism 251 is programmed for different types of food, so that after food has been placed in a particular compartment 207, an operator simply selects that type of food from a suitable menu on a display (not shown) on the cabinet. The control mechanism then automatically selects the appropriate heating protocol for the food selected, including one or more of the following: the ideal holding temperature for the food selected; the duration of holding time ("holding duration"); and the manner in which the heat source in each compartment is to be varied to maintain the food at the desired holding temperature (e.g., percent on time during each duty cyle, if duty cycles are used). For convenience, the control 251 also includes a timer which times out the holding duration, and a display 255 which shows the time remaining until the end of holding duration. The control mechanism 251 may also include a visual and/or audible alarm for alerting an operator at a predetermined time before the end of the holding duration, so that steps can be taken to start cooking a fresh batch or batches of additional food. (At the end of a holding duration, any food remaining in the compartments 207 is typically disposed of and replaced by freshly cooked food.)

Figure 22A:
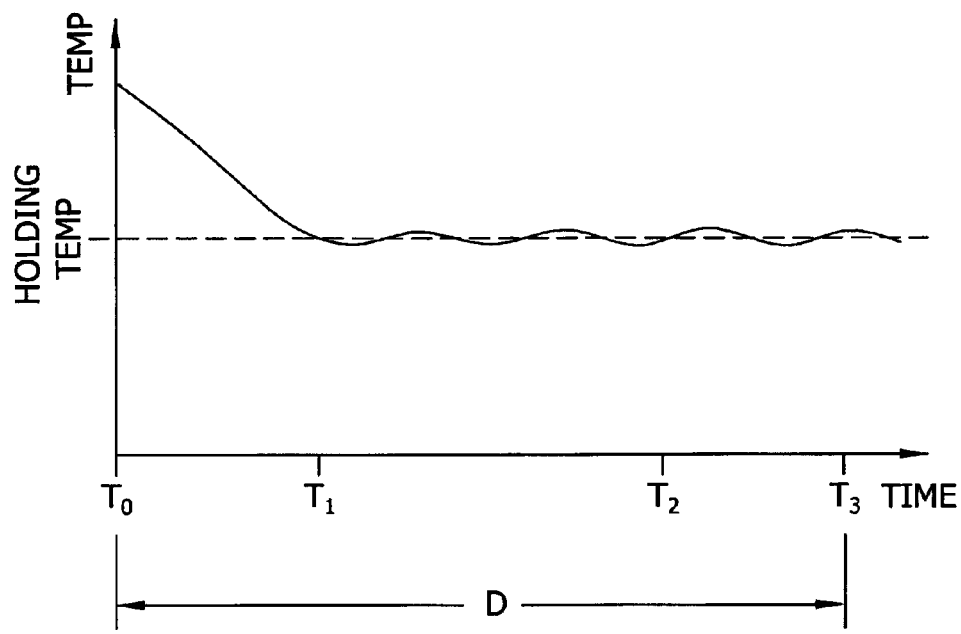
FIG. 22A is a graph of a time v. holding temperature curve during an embodiment of a holding duration.
Figure 22B:
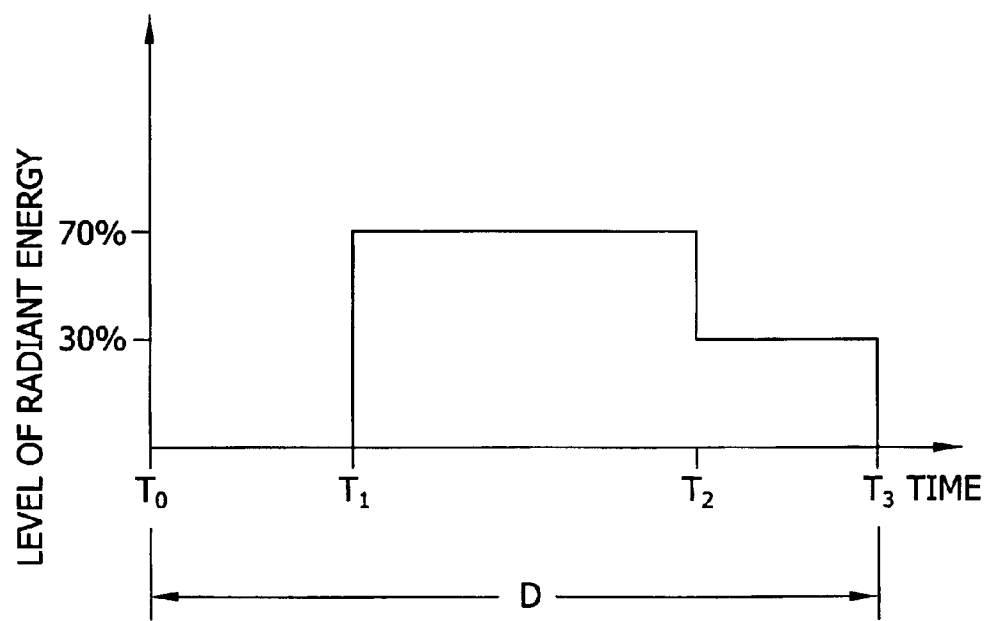
FIG. 22B is a graph of time v. radiant energy curve during the embodiment of FIG. 22A.

As noted previously, an important aspect of this invention is the ability of the control mechanism 251 to vary the amount of radiant heat delivered by the heat source in each compartment 207 to the pre-cooked food in the compartment. In general, or at least typically, it is desirable that pre-cooked food introduced into the compartment be allowed to cool down as quickly as possible to the desired holding temperature, and that the food be held relatively constant at the desired holding temperature using a minimum of power to the heat source 235. The graphs in FIGS. 22A and 22B illustrate this concept. FIG. 22A graphs time v. temperature in one compartment 207. Pre-cooked food introduced into the compartment at time $T_0$ cools down to the desired holding temperature at time $T_1$. Thereafter, the food is substantially maintained at the holding temperature for the remainder of the holding duration D. FIG. 22B is a graph of time v. the radiant energy delivered by the heat source 235 to the food. In the particular embodiment shown in this graph, the heat source is operated at a first relatively low level (where the heater is either off or delivering radiant heat at low level of energy or power) during a first phase P1 from time $T_0$ to time $T_1$, so that little or no radiant energy is delivered to the food. As a result, the temperature of the food declines relatively rapidly toward ambient temperature. When the temperature of the food approaches (or reaches) the desired holding temperature, the control mechanism 251 causes the heat source 235 in the compartment 207 to deliver radiant heat at a second higher level (e.g., 70% of maximum) to stop the decline in temperature of the food and hold it at about the desired holding temperature during a second phase P2 from time $T_1$ to time $T_2$. After the temperature of the food has equilibrated at the desired holding temperature, which will vary depending on the particular type of food, the control mechanism 251 causes the heat source 235 to reduce the amount of radiant heat delivered to the food to a third level (e.g., 30% maximum) sufficient to maintain the food at the desired holding temperature during a third phase P3 from time T2 until the end of the holding period at time T3.

It will be understood that the graphs shown in FIGS. 22A and 22B can vary, and that the number of phases P1, P2, P3 discussed above can vary without departing from the scope of this invention.

Figure 23:
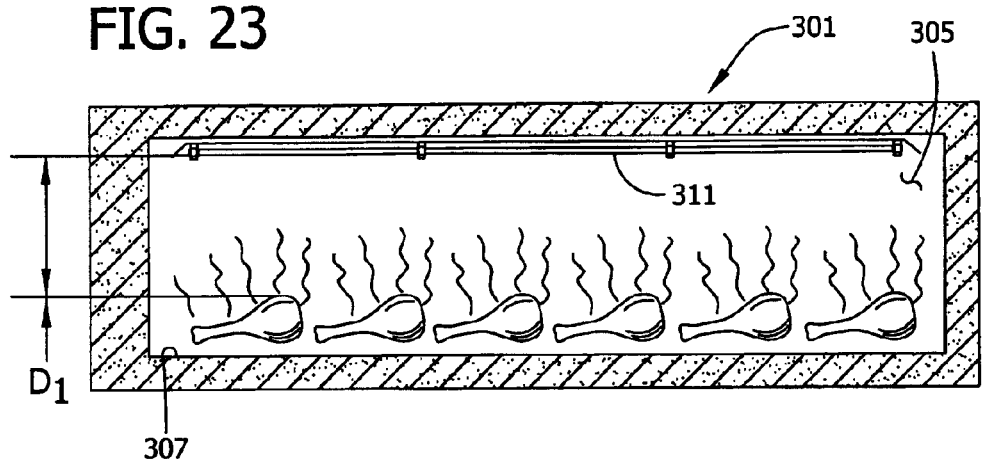
FIG. 23 is a schematic view of a holding oven of another embodiment.

FIG. 23 shows another embodiment of a holding oven of this invention, generally designated 301. The oven is similar to those described above except that the cabinet of the unit has only one compartment. In this embodiment, food is not placed in a tray, but rather on the bottom wall 307 or other supporting surface in the compartment, and the heat source 311 is closely spaced above the food to heat the food and maintain it at the desired holding temperature. The spacing D1 between the food and the IR heat source is relatively small (as discussed above) to reduce the overall height dimension of the oven 301. The heat source 311 is controlled by a control mechanism 140, 251 of the type described above.

Figure 24:
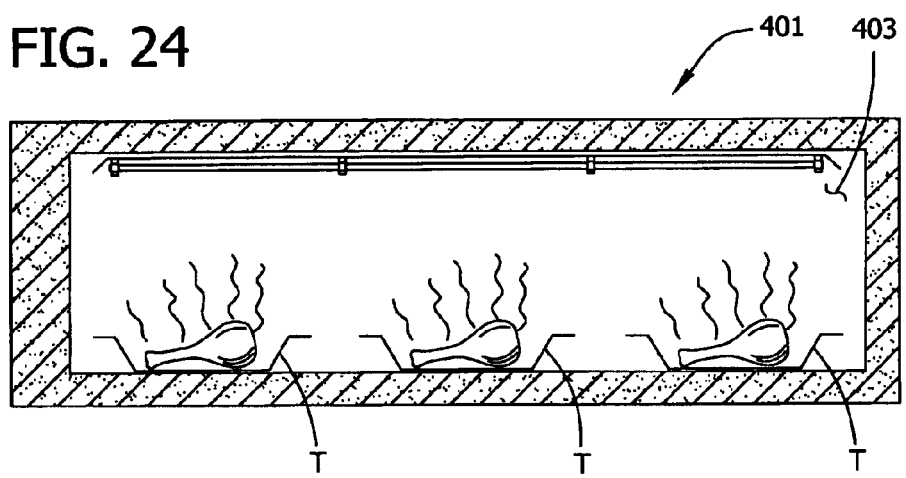
FIG. 24 is a schematic view of a holding oven of still another embodiment.

FIG. 24 shows a holding oven, generally designated 401, which is similar to the oven shown in FIG. 23. In this embodiment, the single compartment 403 of the oven is sized to hold multiple trays T. All other aspects of the oven, including the heat source and control mechanism, are the same.

Figure 25:
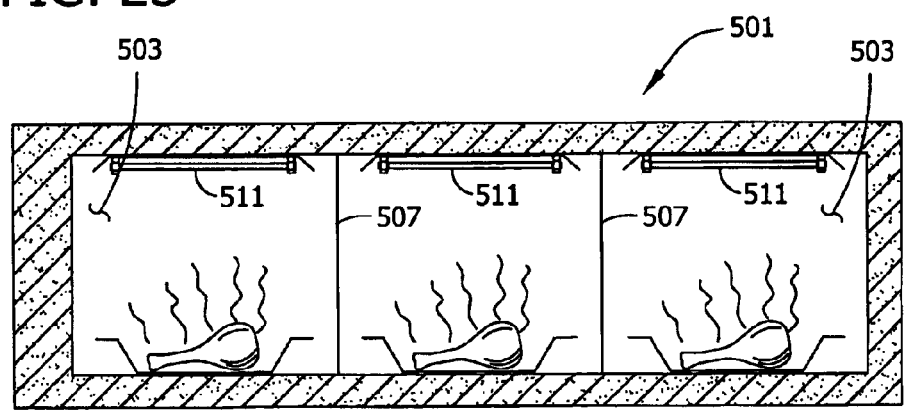
FIG. 25 is a schematic view of a holding oven of yet another embodiment.

FIG. 25 shows a holding oven, generally designated 501, which is similar to the oven shown in FIG. 24 except that the oven is divided into three compartments 503, each of which is capable of receiving food placed on the bottom wall or other supporting surface in the compartment. Partitions 507 between the compartments prevent or at least inhibit the transfer of food flavors between adjacent compartments. Each compartment 503 has its own heat source 511 which is spaced relatively closely to the bottom wall of the compartment to maintain the distance between the food and the heat source within the ranges (e.g., distance D1) described above. The heat sources 511 are controlled by a control mechanism similar to the control mechanism 140, 251 described above.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. Food holding apparatus for holding pre-cooked food at a selected holding temperature, said apparatus comprising:
    a cabinet having at least one holding compartment therein;
    pre-cooked food in the holding compartment, said food having been previously cooked in a cooking appliance;
    at least one infrared heat source spaced above the food a distance less than 12 inches for delivering infrared heat to the food;
    said infrared heat source being selected from the group of (i) ceramic infrared heat source, (ii) halogen infrared heat source, (iii) quartz infrared heat source, and (iv) infrared heat lamp; and
    a control mechanism for varying the amount of infrared heat delivered by the infrared heat source to the food during a duration of holding time to maintain the food at said selected holding temperature.

2. Food holding apparatus as set forth in claim 1 wherein said control mechanism is programmed to operate said at least one infrared heat source in successive time-based cycles.

3. Food holding apparatus as set forth in claim 1 wherein each of said time-based cycles comprises a first time interval during which the at least one infrared heat source is activated to deliver infrared heat and a second time interval during which the heat source is not activated.

4. Food holding apparatus as set forth in claim 1 wherein said distance is less than 6 in.

5. Food holding apparatus as set forth in claim 1 wherein said distance is less than 4 in.

6. Food holding apparatus as set forth in claim 1 wherein said distance is less than 2 in.

7. Food holding apparatus as set forth in claim 1 further comprising a glass panel between said at least one infrared heat source and said pre-cooked food.

8. Food holding apparatus as set forth in claim 1 wherein said distance is in the range of 0.25–8 in.

9. Food holding apparatus as set forth in claim 1 wherein said distance is in the range of 0.25–6 in.

10. Food holding apparatus as set forth in claim 1 wherein said distance is in the range of 0.25–4 in.

11. Food holding apparatus as set forth in claim 1 wherein said distance is in the range of 0.25–2 in.

12. Food holding apparatus as set forth in claim 1 further comprising partitions in the cabinet dividing the cabinet into a plurality of separate holding compartments, at least one tray in each of said holding compartments holding pre-cooked food therein, at least one infrared heat source spaced above the pre-cooked food in said tray a distance less than 12 inches for delivering infrared heat to the food, and said control mechanism being adapted for controlling operation of the heat sources independent of one another whereby the temperature in each compartment may be independently controlled.

13. Food holding apparatus as set forth in claim 1 wherein said control mechanism is operable to vary the infrared heat delivered by said at least one heat source to the food through a duration of holding time, said duration comprising a first phase at which infrared heat is delivered to the food by the heat source at a first level to permit said pre-cooked food to cool down to said selected holding temperature, and a second phase at which infrared heat is delivered to the food by the heat source at a second level higher than said first level to hold the food at said selected holding temperature.

14. Food holding apparatus as set forth in claim 13 wherein said duration of holding time further comprises a third phase at which infrared heat is delivered to the food at a third level less than said second level to maintain said pre-cooked food at said holding temperature.

15. Food holding apparatus as set forth in claim 1 wherein said control mechanism comprises at least one sensor in the compartment for detecting a characteristic indicative of the temperature of the pre-cooked food in the compartment, the control mechanism being responsive to signals from said sensor to vary the amount of infrared heat delivered by the heat source to the food to maintain the food at said selected holding temperature.

16. Food holding apparatus as set forth in claim 15 wherein said sensor is a temperature sensor for detecting the temperature of a surface in the compartment.

17. Food holding apparatus as set forth in claim 15 wherein said sensor is operable to detect infrared energy emitted by said pre-cooked food.

18. Food holding apparatus as set forth in claim 1 wherein said control mechanism is programmed to operate said heating source according to a predetermined protocol to vary said infrared energy delivered to said food depending on the type of pre-cooked food placed in the compartment.

19. A food holding oven for holding pre-cooked food at a selected food holding temperature, said food holding oven comprising:
    a cabinet having a front, a back, and an interior space;
    a plurality of separate, thermally isolated holding compartments in the interior space of the cabinet for holding pre-cooked food, said holding compartments comprising a first row of compartments and a second row of compartments, the first row being arranged above the second row;
    each compartment having an open front end at the front of the cabinet for placement of the pre-cooked food in the compartment and removal of said pre-cooked food from the compartment;
    at least one infrared heat source for delivering infrared heat to the pre-cooked food; and
    a control mechanism for varying the amount of infrared heat delivered by said at least one infrared heat source to the pre-cooked food during a duration of holding time to maintain the pre-cooked food at said selected holding temperature.

20. A food holding oven as set forth in claim 19 wherein each compartment receives a tray for holding the pre-cooked food and has an open back end at the rear of the cabinet for placement of a respective tray in the compartment and removal of said tray from the compartment.

21. A food holding oven as set forth in claim 19 wherein the front ends of said compartments are doorless and remain open during a heating operation.

22. A food holding oven as set forth in claim 19 wherein said control mechanism is operable to vary the infrared heat delivered by said at least one heat source to the pre-cooked food through a duration of holding time, said duration comprising a first phase at which infrared heat is delivered to the pre-cooked food by the heat source at a first level to permit said pre-cooked food to cool down to said selected holding temperature, and a second phase at which infrared heat is delivered to the pre-cooked food by the heat source at a second level higher than said first level to hold the pre-cooked food at said selected holding temperature.

23. A food holding apparatus as set forth in claim 22 wherein said duration of holding time further comprises a third phase at which infrared heat is delivered to the pre-cooked food at a third level less than said second level to maintain said pre-cooked food at said holding temperature.

24. A food holding oven as set forth in claim 19 where in said control mechanism is programmed to operate said heat source according to a predetermined protocol to vary the amount of infrared heat delivered to the pre-cooked food depending on the type of pre-cooked food placed in the compartment.

25. A food holding oven as set forth in claim 19 wherein said control mechanism comprises an operator input device for selecting a type of pre-cooked food placed in a respective compartment, and wherein said control mechanism is programmed to operate a respective heat source to heat the pre-cooked food in said respective compartment to a pre-programmed selected holding temperature and to hold the pre-cooked food at said pre-programmed selected holding temperature.

26. A food holding oven as set forth in claim 19 wherein said infrared heat source is selected from the group of (i) ceramic infrared heat source, (ii) halogen infrared heat source, (iii) quartz infrared heat source, and (iv) infrared heat lamp.

27. A food holding oven as set forth in claim 19 wherein said control mechanism controls the operation of the heat sources independent of one another whereby the food holding temperature in each compartment may be independently controlled.

28. A food holding oven as set forth in claim 19 wherein said control mechanism is programmed to operate said infrared heat source in successive time-based cycles.

29. A food holding oven as set forth in claim 28 wherein each of said time-based cycles comprising a first time interval during which the heat source is activated to deliver infrared heat and a second time interval during which the heat source is not activated.

30. A food holding oven as set forth in claim 19 further comprising a glass panel between said infrared heat source and said pre-cooked food.

31. Food holding apparatus for holding pre-cooked food at a selected holding temperature, said apparatus comprising:
  a cabinet having at least one holding compartment therein;
  pre-cooked food in the holding compartment, said food having been previously cooked in a cooking appliance;
  at least one infrared heat source spaced above the food a distance less than 12 inches for delivering infrared heat to the food; and
  a control mechanism programmed for operating said at least one infrared heat source in successive time-based cycles during a duration of holding time to maintain the food at said selected holding temperature.

32. Food holding apparatus as set forth in claim 31 wherein each of said time-based cycles comprising a first time interval during which the at least one infrared heat source is activated to deliver infrared heat and a second time interval during which the heat source is not activated.

33. Food holding apparatus as set forth in claim 32 wherein said control mechanism is further programmed for varying a length of said firt time interval from one time-based cycle to another time-based cycle.

34. Food holding apparatus for holding pre-cooked food at a selected holding temperature, said apparatus comprising:
  a cabinet having at least one holding compartment therein;
  pre-cooked food in the holding compartment, said food having been previously cooked in a cooking appliance;
  at least one infrared heat source spaced above the food a distance less than 12 inches for delivering infrared heat energy directly to the food;
  said infrared heat source being selected from the group of (i) ceramic infrared heat source, (ii) halogen infrared heat source, (iii) quartz infrared heat source, (iv) resistance heating element embedded in magnesium oxide, and (v) infrared heat lamp; and p1 a control mechanism for varying the amount of infrared heat energy delivered by the infrared heat source to the food during a duration of holding time to maintain the food at said selected holding temperature.

35. Food holding apparatus as set forth in claim 34 further comprising a panel transparent to said infrared heat energy positioned between said at least one heat source and said pre-cooked food.

* * * * *